United States Patent
Tomatsuri et al.

(10) Patent No.: US 9,983,994 B2
(45) Date of Patent: May 29, 2018

(54) ARITHMETIC PROCESSING DEVICE AND METHOD FOR CONTROLLING ARITHMETIC PROCESSING DEVICE

(71) Applicant: FUJITSU LIMITED, Kawasaki-shi, Kanagawa (JP)

(72) Inventors: Hideaki Tomatsuri, Narashino (JP); Naoya Ishimura, Tama (JP); Hiroyuki Kojima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 15/213,737

(22) Filed: Jul. 19, 2016

(65) Prior Publication Data
US 2017/0046262 A1     Feb. 16, 2017

(30) Foreign Application Priority Data
Aug. 12, 2015    (JP) ................... 2015-159301

(51) Int. Cl.
| | |
|---|---|
| G06F 12/00 | (2006.01) |
| G06F 13/00 | (2006.01) |
| G06F 13/28 | (2006.01) |
| G06F 12/0804 | (2016.01) |
| G06F 12/0815 | (2016.01) |

(52) U.S. Cl.
CPC ...... *G06F 12/0804* (2013.01); *G06F 12/0815* (2013.01); *G06F 2212/1041* (2013.01); *G06F 2212/283* (2013.01); *G06F 2212/62* (2013.01)

(58) Field of Classification Search
CPC ............. G06F 12/0804; G06F 12/0815; G06F 2212/1041; G06F 2212/283; G06F 2212/62

USPC .......................................................... 711/119
See application file for complete search history.

(56) References Cited

U.S. PATENT DOCUMENTS

| | | | | |
|---|---|---|---|---|
| 5,761,724 A * | 6/1998 | Jhon | ................... | G06F 12/0833 711/121 |
| 5,890,217 A * | 3/1999 | Kabemoto | .......... | G06F 12/0817 711/120 |
| 6,292,906 B1 * | 9/2001 | Fu | ........................ | G06F 12/0831 711/146 |
| 6,631,447 B1 * | 10/2003 | Morioka | ............. | G06F 12/0815 711/118 |
| 7,272,688 B1 * | 9/2007 | Glasco | ................ | G06F 12/0808 711/141 |

(Continued)

FOREIGN PATENT DOCUMENTS

JP     2001-034533     2/2001

*Primary Examiner* — Sheng-Jen Tsai
(74) *Attorney, Agent, or Firm* — Fujitsu Patent Center

(57) ABSTRACT

An arithmetic processing device includes a plurality of core units, each including a plurality of cores each having a arithmetic and logic unit, and a cache memory shared by the plurality of cores; a home agent connected to the cache memories provided respectively in the core units; and a memory access controller connected to the home agent and controls access to a main memory. The cache memories each includes a data memory having cache blocks, and a first tag which stores a first state indicating a MESI state, for each of the cache blocks, and the home agent includes a second tag which stores a second state including at least a shared modify state in which dirty data is shared by cache memories, for each of the cache blocks in the cache memories provided respectively in each of the core units.

12 Claims, 29 Drawing Sheets

(56) References Cited

U.S. PATENT DOCUMENTS

| | | | |
|---|---|---|---|
| 9,626,321 B2* | 4/2017 | Safranek | G06F 13/4022 |
| 9,772,950 B2* | 9/2017 | Solihin | G06F 12/0897 |
| 2003/0115423 A1* | 6/2003 | Chang | G06F 12/0831 |
| | | | 711/145 |
| 2004/0103251 A1* | 5/2004 | Alsup | G06F 12/0897 |
| | | | 711/122 |
| 2004/0199727 A1* | 10/2004 | Narad | G06F 12/0835 |
| | | | 711/138 |
| 2008/0005484 A1* | 1/2008 | Joshi | G06F 12/0815 |
| | | | 711/141 |
| 2009/0157981 A1* | 6/2009 | Kinter | G06F 9/30047 |
| | | | 711/141 |
| 2009/0327609 A1* | 12/2009 | Fleming | G06F 12/0802 |
| | | | 711/118 |
| 2014/0006714 A1* | 1/2014 | Cherukuri | G06F 12/0817 |
| | | | 711/128 |
| 2014/0082297 A1* | 3/2014 | Solihin | G06F 12/082 |
| | | | 711/136 |
| 2014/0112339 A1* | 4/2014 | Safranek | G06F 12/0831 |
| | | | 370/389 |
| 2014/0181404 A1* | 6/2014 | Chaudhary | G06F 12/0811 |
| | | | 711/122 |
| 2014/0181413 A1* | 6/2014 | Manne | G06F 12/0891 |
| | | | 711/135 |
| 2014/0189255 A1* | 7/2014 | Sundararaman | G06F 12/0817 |
| | | | 711/146 |
| 2015/0286577 A1* | 10/2015 | Solihin | G06F 12/0813 |
| | | | 711/122 |
| 2016/0092223 A1* | 3/2016 | Wang | G06F 9/3004 |
| | | | 712/208 |
| 2016/0179533 A1* | 6/2016 | Gramunt | G06F 9/4806 |
| | | | 712/207 |
| 2016/0246723 A1* | 8/2016 | Doshi | G06F 12/0811 |

* cited by examiner

FIG.5

| STATE | LL_S (last level cache state) | HA_S (home agent state) | STATE OF THE CPU AS VIEWED FROM THE OTHER CPU |
|---|---|---|---|
| 1 | I | I | I |
| 2 | S | S | S |
| 3 | S | A: Exclusive, shared | E |
| 4 | S | Z: Modified, shared | M |
| 5 | E | E | E |
| 6 | M | E | M |
| 7 | E | M | M |
| 8 | M | M | M |

M: Modified
E: Exclusive
S: Shared
I: Invalid
A: E (Exclusive) DATA IS SHARED BETWEEN LLCS IN CPU
Z: M (Modified) DATA IS SHARED BETWEEN LLCS IN CPU

FIG.9

DIRECTORY

| ADDRESS (IN CACHE BLOCK UNITS) | STATE | WHICH CPU (AND WHICH NODE)? (INFORMATION OF DATA TAKEN CPU) |
|---|---|---|
| ADD1 | DIR=R-EX | CPU[15:0]=1000000000000000-0 |
| ADD2 | DIR=L | CPU[15:0]=0000000000000000-0 |
| ADD3 | DIR=R-SH | CPU[15:0]=0100000000000001-0 |
| ADD4 | DIR=R-SH | CPU[15:0]=1111111111111111-1 |

ARITHMETIC PROCESSING DEVICE AND METHOD FOR CONTROLLING ARITHMETIC PROCESSING DEVICE

CROSS-REFERENCE TO RELATED APPLICATION

This application is based upon and claims the benefit of priority of the prior Japanese Patent Application No. 2015-159301, filed on Aug. 12, 2015, the entire contents of which are incorporated herein by reference.

FIELD

The present invention relates to an arithmetic processing device, and a control method for an arithmetic processing device.

BACKGROUND

An arithmetic processing device (CPU: central processing unit or processor) has a plurality of cores, a last level cache (hereinafter, LLC) which is nearest to the main memory in the memory hierarchy and which is shared by the plurality of cores, and a memory controller. The memory hierarchy includes, for example, a level 1 cache (L1 cache) which is provided inside the core, and a level 2 cache (L2 cache) which is provided outside the core, is shared by the plurality of cores, and is connected to the main memory outside the processor. In this case, the L2 cache which is nearest to the main memory corresponds to the LLC. Alternatively, if the memory hierarchy has an L1 cache and an L2 cache in the cores, and outside the cores, a level 3 cache (L3 cache) which is connected to the main memory outside the processor and which is shared by the plurality of cores, then the L3 cache nearest to the main memory corresponds to the LLC.

In any hierarchical structure, if a cache miss occurs in the LLC, then the LLC issues a fetch request to the memory controller of the processor managing the data, and the memory controller accesses the main memory, reads out the data, and provides a data response to the LLC originating the request. The LLC originating the request registers the read out data in the cache (cache fill), and also sends a data response to the core.

The volume of caches is tending to increase. In other words, the number of cores integrated into a CPU chip is increasing with process miniaturization. Furthermore, with the increase in the number of cores (number of threads), the associativity (number of ways) in a set associative cache rises. Along with this, the volume of the LLC which is shared by the plurality of cores also increases. Consequently, high-end processor chips are tending to increase in size with improvements in performance, despite the reduction in surface area achieved by the miniaturization.

In the midst of these circumstances, if an LLC configuration is adopted which enables a many-core processor equal access from each of the cores, then the data access path to the LLC becomes longer, due to the large chip size and the large-capacity LLC, and the hit latency of the LLC increases.

Therefore, rather than a single LLC configuration which is shared by all of the cores, a configuration has been proposed in which the LLC is divided into a plurality of caches, and a plurality of core groups respectively share each of the divided LLCs. In a configuration of this kind, the LLC shared by each core group has a smaller capacity, the physical distance from the core to the LLC in the core group is shorter, the control is also simplified, and high-speed access becomes possible. In other words, compared to a single large-capacity LLC configuration which permits equal access from all of the cores, adopting a configuration which includes a plurality of core groups in which a limited number of cores share LLC of small capacity enables faster hit latency of the LLCs.

SUMMARY

However, when a configuration is adopted in which a plurality of LLCs are provided in a single arithmetic processing device, then in the course of coherency control between the plurality of LLCs, there is frequent occurrence of access to the directory in the main memory, and write-back access to the main memory on the basis of the MESI protocol, and so on. This kind of increase in the frequency of access to the main memory leads to a decrease in performance which slows the memory latency.

According to the first aspect of the disclosure, an arithmetic processing device, includes a plurality of core units, each provided with a plurality of cores each having a arithmetic and logic unit, and a cache memory which is shared by the plurality of cores; a home agent operatively connected to the cache memories provided respectively in the plurality of core units; and a memory access controller operatively connected to the home agent and controls access to a main memory, wherein the cache memories each includes a data memory having a plurality of cache blocks, and a first tag which stores a first state indicating a MESI state, for each of the plurality of cache blocks, and the home agent includes a second tag which stores a second state including at least a shared modify state in which dirty data is shared by a plurality of cache memories, for each of the plurality of cache blocks in the cache memories provided respectively in each of the plurality of core units.

According to the first aspect of the disclosure, it is possible to suppress the frequency of access to the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating a combination of the first state and the second state in the present embodiment;

FIG. 9 is a diagram illustrating an example of a directory stored in the main memory;

DESCRIPTION OF EMBODIMENTS

Figure 1:
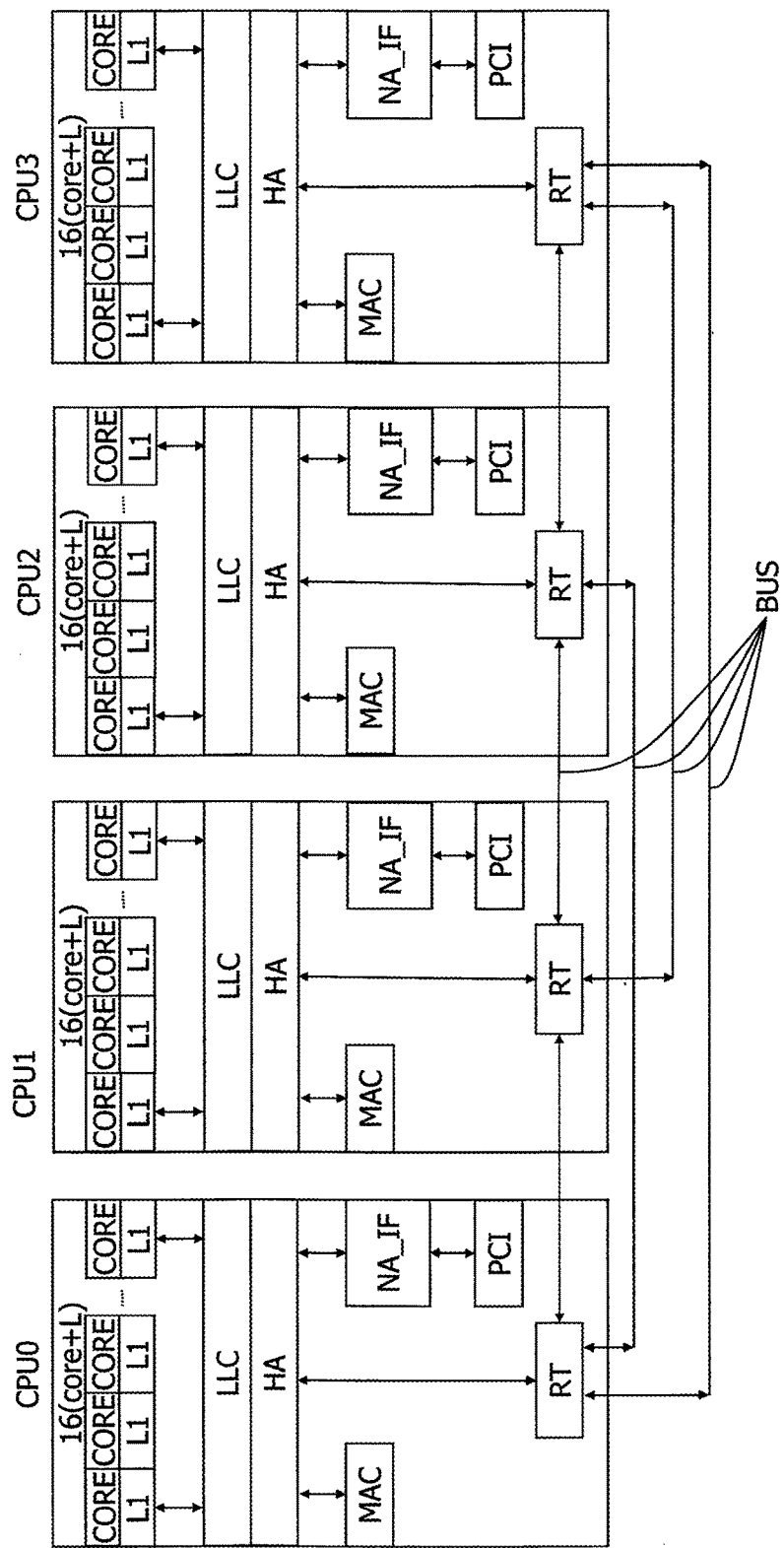
FIG. 1 is a diagram illustrating an example of a configuration in which each arithmetic processing device has a single LLC.

FIG. 1 is a diagram illustrating an example of a configuration in which each arithmetic processing device (CPU or processor) has a single LLC. FIG. 1 illustrates four arithmetic processing devices CPU0 to CPU3. Each arithmetic processing device CPU has sixteen cores, CORE, for example. Each core, CORE, has a arithmetic and logic unit (not illustrated) and an L1 cache. Each arithmetic processing device CPU has a single last-level cache LLC (hereinafter, simply "LLC") which is shared by the sixteen cores, and also a home agent HA, a memory access controller MAC, a router RT which transfers data between arithmetic processing devices, etc., an interface for non-cache access NA_IF, and a PCI bus, etc. The memory access controllers MAC each control access to a main memory, which is not illustrated. The router RT in each CPU is connected to the routers RT of the other CPUs via a bus, BUS, between the CPUs.

Here, the last-level cache means the cache memory which is nearest to the main memory in the memory hierarchy, and is a cache memory which is connected to the main memory outside the processor via the memory access controller MAC.

Figure 2:
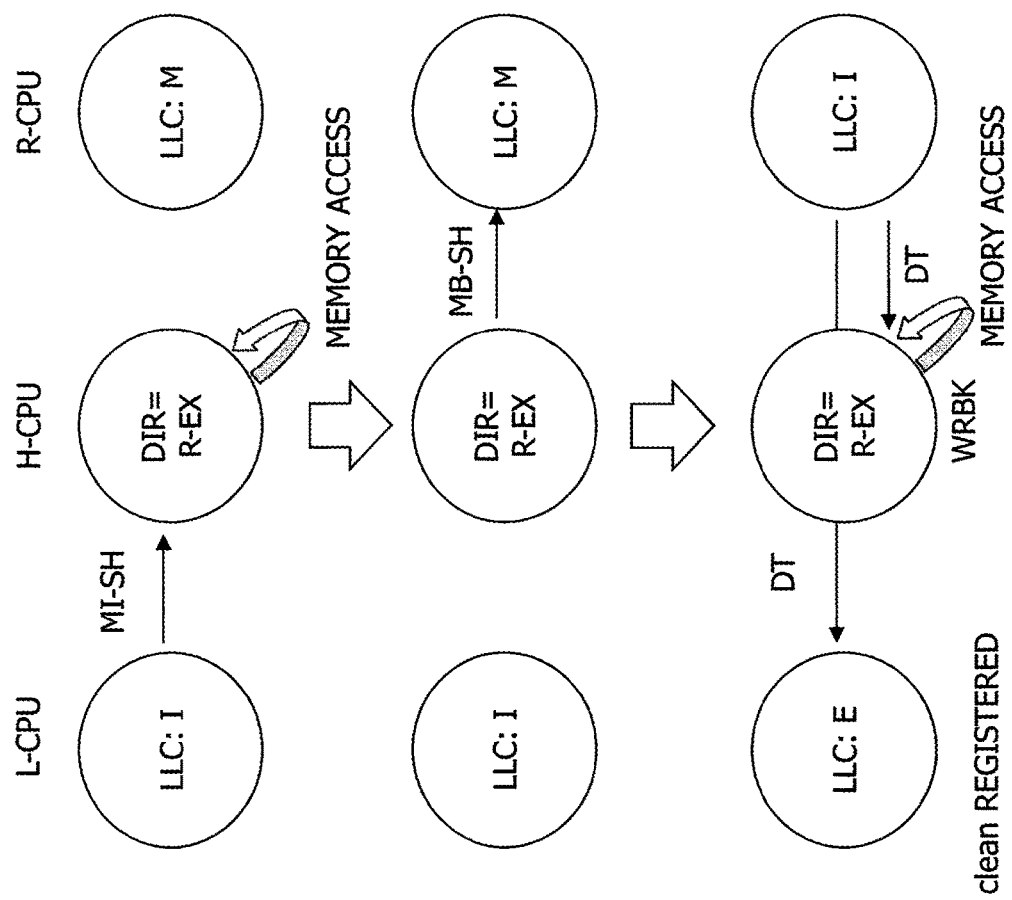
FIG. 2 is a diagram illustrating an example of the processing of a load request in the arithmetic processing devices in FIG. 1.

FIG. 2 is a diagram illustrating an example of the processing of a load request in the arithmetic processing devices in FIG. 1. FIG. 2 illustrates processing in a case where, for example, the arithmetic processing device CPU0 has requested data from the memory area of the CPU1 (a load request or read request). The CPU that has issued the request is called the "local CPU (L-CPU)", the CPU which manages the memory holding the requested data is called the "home CPU (H-CPU)", the CPU which takes out the requested data from the home H-CPU is called the "remote CPU (R-CPU)". The home CPU stores, in a directory DIR, information indicating whether or not data in the memory managed by the home CPU has been taken out by another CPU. The states of the directory are, for example, a state where no CPU has taken out data (L: Local), a state where one CPU has taken out data (R-EX: Remote Exclusive), and a state where two or more CPUs have taken out data (R-SH: Remote Share). The directory is stored in the main memory.

The cache protocol in the LLC generally uses a MESI protocol. According to the MESI protocol, the state (State) of the data in each cache block in a cache memory is one of the following four states. Firstly, the M (Modify) state is a "dirty" state in which the data read out from the main memory has been changed, and when another CPU reads data from a cache block in an M state, the other CPU has to write-back the data of this cache block, to the main memory. The E (Exclusive) state is a "clean" state in which the data read out from the main memory has not been changed, and matches the values in the main memory. The S (Share) state is a state in which the same data is also stored in another cache memory, and the values also match those in the main memory. The I (Invalid) state is a state in which the cache block is invalid. The combinations of states that can be adopted by cache blocks corresponding to two cache memories are: M/I, E/I, S/S, S/I, I/I.

The MESI state is stored as a state code (State) in a cache tag in the cache. One example of a state transfer is where a cache block in the I state changes to the E state upon having data filled (registered) therein by a read request, and changes to the M state when that data is rewritten by a write request. The data of a cache block in the E state changes to the S state when read by another cache. When a read request is made for data corresponding to a cache block in the M state, the data in the cache block in the M state is written back to the main memory, and the cache block in the cache that made the read request changes the state to the E state.

Returning to FIG. 2, firstly, the LLC of the local CPU (L-CPU), in the event of a cache miss, sends a data location confirmation request MI-SH to the home CPU (H-CPU). In response to this confirmation request, the home agent of the home CPU executes memory access to the main memory, and checks the directory DIR information in the memory. Here, the directory DIR indicates that a remote CPU has taken out the data (R-EX).

Thereupon, the home agent HA of the home CPU sends a request (MB-SH) for eviction and transfer of data, to the LLC of the remote CPU (R-CPU). In this example, since the LLC of the remote CPU (R-CPU) holds data in the M (Modify) state, then the home agent of the home CPU transfers (DT) the received data to the local CPU (L-CPU) originating the request, and simultaneously writes back the data to the main memory (WRBK). The states of LLCs and the directory after this processing are as follows: the LLC of the local CPU (L-CPU) is in the E (Exclusive) state, the LLC of the remote CPU (R-CPU) is in the I (Invalid) state, and the directory DIR of the home CPU is again in the R-EX state (a state in which a remote CPU has taken out data).

According to FIG. 2, during the process of transferring data from the remote CPU (R-CPU) to the local CPU (L-CPU) via the home CPU (H-CPU), two memory accesses occur.

In the case of CPUs having the configuration in FIG. 1, it is envisaged that virtually all memory access operations are directed by a CPU to the memory managed by that CPU, and therefore the frequency of access to a memory managed by another CPU is low. Therefore, delay occurring due to access to the memory of another CPU has a limited effect on the average memory latency. Access by a CPU to the memory managed by that CPU also serves as access to the directory in order to check whether or not another CPU has taken out data. Therefore, the number of steps to be taken so as to access the directory does not involve additional steps.

However, in the CPUs illustrated in FIG. 1, when the number of cores increases due to the advance in miniaturization and the enlargement of the chip size, the capacity of the LLCs increases, the LLC circuit area becomes larger, and furthermore, the operating frequency becomes faster, the cache latency also tends to become longer. In accordance with this, in order to improve the processing performance of the CPU, the cache latency has to be shortened.

Shortening the physical distance of the cache is an effective way to shorten the cache latency, and as described above, a configuration in which the LLCs in the CPU chips are divided up and each of the divided LLCs is shared by a smaller number of cores is effective in achieving this.

[Example of Configuration of CPU, LLC and HA in the Present Embodiment]

Figure 3:
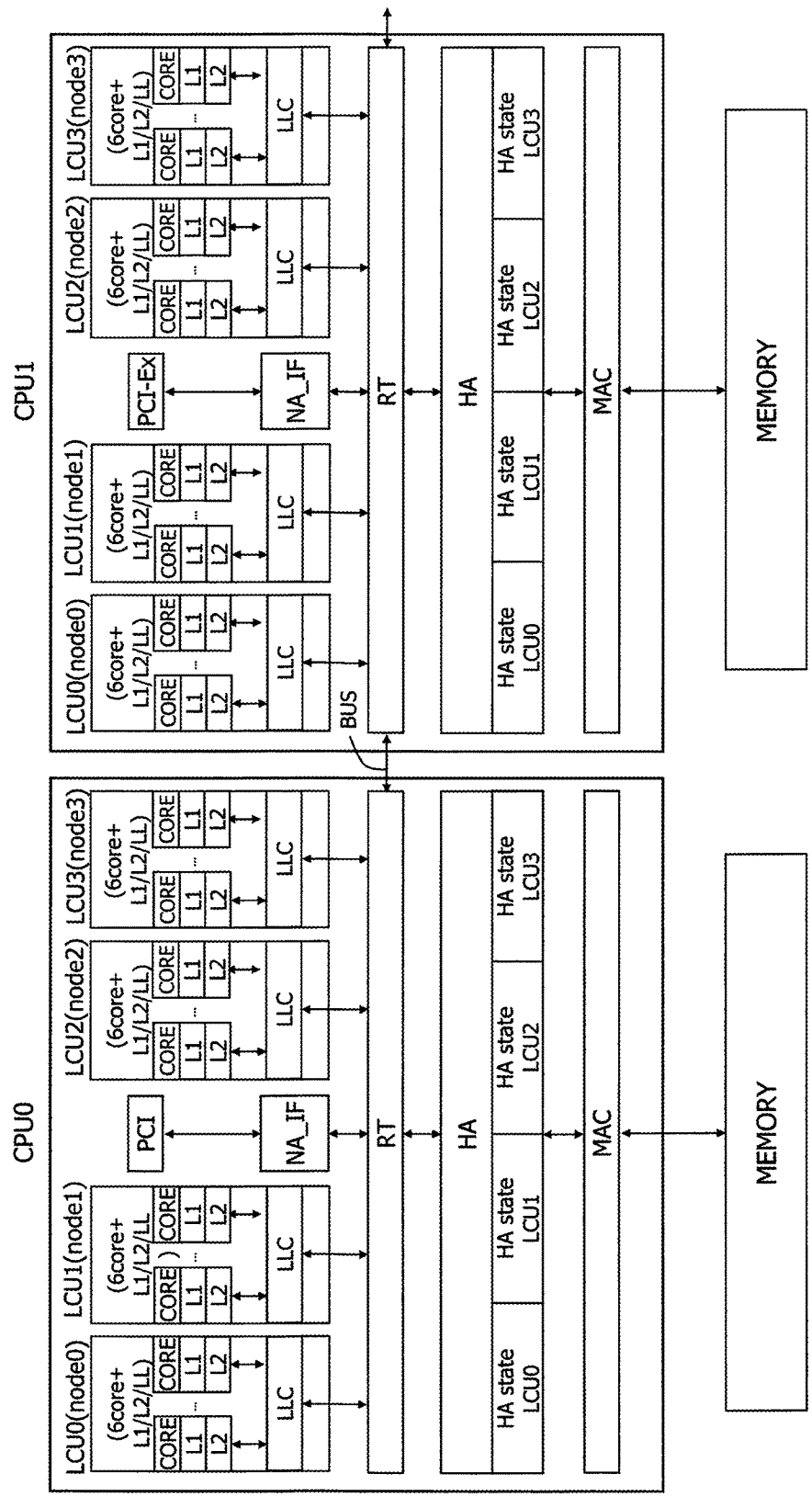
FIG. 3 is a diagram illustrating the configuration of arithmetic processing devices according to the present embodiment.

FIG. 3 is a diagram illustrating the configuration of arithmetic processing devices (CPUs) according to the present embodiment. FIG. 3 illustrates two CPUs having the same configuration, by way of an example. For example, CPU0 has a plurality of core units LCU0 to LCU3, each provided with a plurality of cores CORE, and a last-level cache LLC which is shared by the plurality of cores. CPU0 has four core units, for example. Furthermore, each core unit LCU has six cores, CORE, for example. The core units LCU0 to LCU3 are also called "nodes", node0 to node 3. Each core, CORE, has a arithmetic and logic unit (not illustrated), an L1 cache, and an L2 cache. The core CORE may also have only the L1 cache.

Moreover, the CPU0 has a home agent HA in common for the plurality of core units LCU0 to LCU3, which is connected to the LLCs in the respective core units LCU0 to LCU3 via a router circuit RT. Furthermore the CPU0 has a memory access controller MAC which controls memory access to the main memory, a non-cache access interface NA-IF, which is an access interface for access other than to the cache, and a PCI bus switch. The CPU0 and CPU1 are interconnected by a CPU bus, BUS, via the respective routers RT. The CPU1 also has the same configuration.

The LLC in each core unit LCU has a cache tag of a first tag (not illustrated), similarly to a normal cache, which stores a first state having a MESI state. The home agent HA has a second tag (indicated as HA state LCU# (where # is 0 to 3) in the drawing) which stores a second state of the LLCs in the four core units. The second state is called the "HA State" (or HA_S). The second state is described in detail below.

Figure 4:
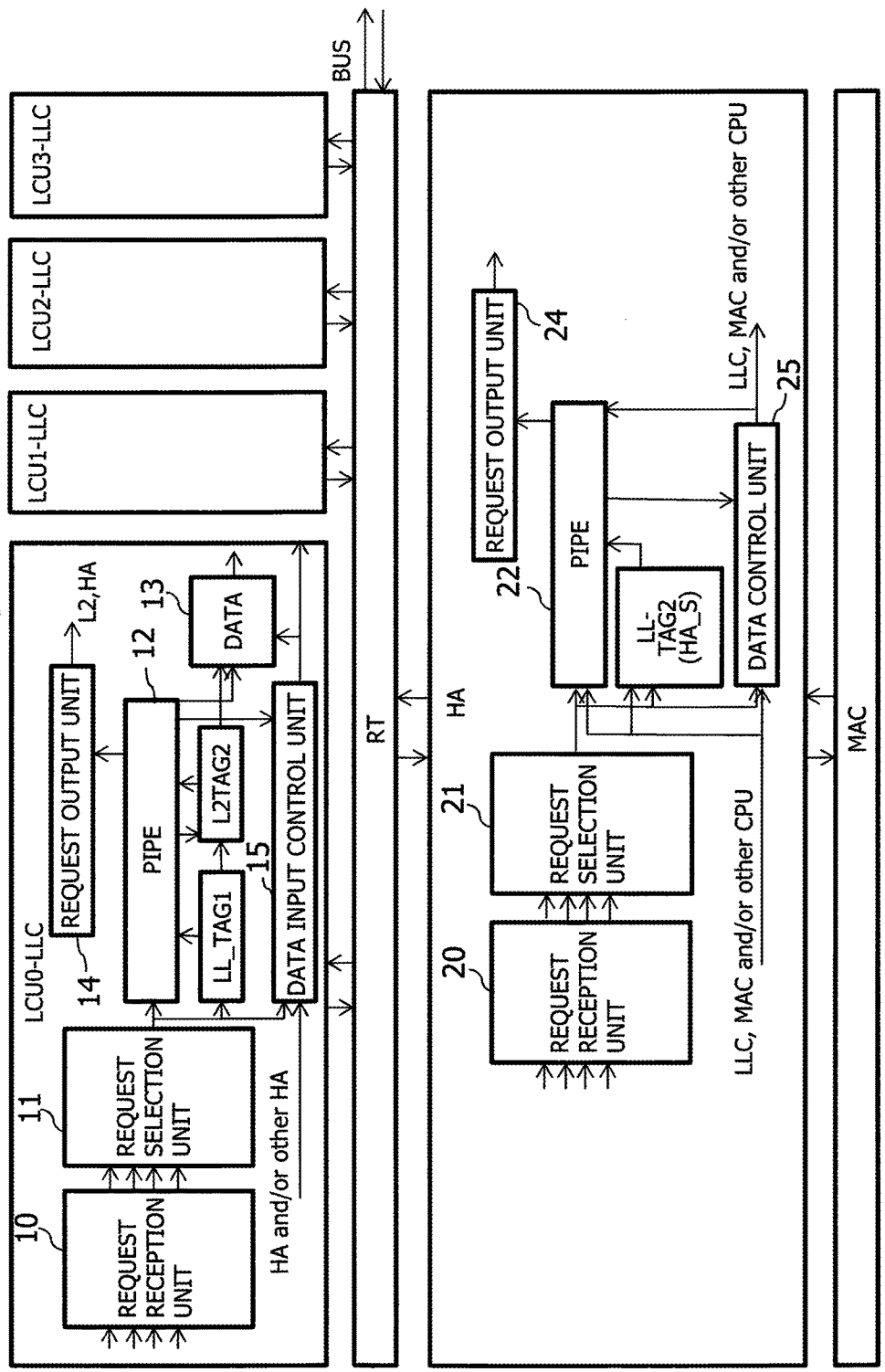
FIG. 4 is a diagram illustrating an example of the configuration of a last-level cache LLC and a home agent HA.

FIG. 4 is a diagram illustrating an example of the configuration of a last-level cache LLC and a home agent HA. The LLC has a request reception circuit (request port) 10 which receives requests from the L2 cache, home agent HA and other CPUs, etc., and a request selection circuit 11 which selects the received requests according to a prescribed priority order. Moreover, the LLC has a pipeline circuit 12 to which the request selected by the request selection circuit 11 is introduced (input), and which executes prescribed cache control. Furthermore, the LLC has an LLC cache tag LL_TAG1, a copy of the L2 cache tag L2TAG2, a data memory 13 which stores data, a request output unit 14 which outputs requests to the L2 cache and HA, etc., and a data input control unit 15 which inputs data from the HA and/or another CPU and registers (fills) the data into the data memory.

The pipeline circuit 12, in the course of processing of the input request, refers to the cache tag LL_TAG1 to determine a cache hit or miss, refers to the L2 tag copy L2TAG2 to carry out other processing, and updates the cache tag LL_TAG1 and/or data memory 13 and outputs requests and/or data to the L2 cache and the HA.

A tag address and first state, which is the MESI state, is stored in the LLC cache tag LL_TAG1, for each cache block of the LLC.

On the other hand, the home agent HA similarly has a request reception circuit 20 which receives requests from the LLC and/or another CPU, a request selection circuit 21 which selects a received request according to a prescribed priority order, a pipeline circuit 22, a request output unit 24 which outputs a request to the LLC, MAC or another CPU, and a data control unit 25 which stores data from the LLC, MAC and/or other CPU, and outputs data to the LLC, MAC and/or other CPU.

The home agent HA, as stated above, has a second tag LL_TAG2 which stores the second state HA_S of the LLCs in the four core units. The pipeline circuit 22 refers to the second tag LL_TAG2 to process input requests in accordance with this state, and outputs requests and/or data to the LLC, MAC and other CPU, etc.

[Combination of First State LL_S and Second State HA_S]

FIG. 5 is a diagram illustrating a combination of the first state and the second state in the present embodiment. In the configuration in FIG. 1, the home agent HA is configured in a one-to-one correspondence with the LLC. On the other hand, in the configuration in FIG. 3, the home agent HA is connected to a plurality of LLCs via the router RT. In the case of FIG. 1, the home agent HA principally manages the directory information in the memory. On the other hand, in the case of FIG. 3, the home agent HA, in addition to managing the directory information, manages the second states (HA State HA_S) of the plurality of LLCs, in order to control the cache protocol between the plurality of LLCs and the HA.

As illustrated in FIG. 5, the first state LL_S which is held in the first tag LL_TAG1 of the LLC may take any one of the MESI states. On the other hand, if the first state LL_S is the S state, the second state HA_S which is held in the second tag LL_TAG2 of the HA has an A state which indicates that E (Exclusive) data is shared between LLCs in the CPU, and a Z state which indicates that M (Modify) data is shared between the LLCs in the CPU. This corresponds to states 3 and 4 in FIG. 5.

In other words, the A state of the second state HA_S is a state in which one CPU among the plurality of CPUs is holding data independently, and in which any two or more LLCs of the plurality of LLCs in that CPU are sharing the data. Furthermore, the Z state of the second state HA_S is a state in which one CPU among the plurality of CPUs is holding the data independently in a rewritten state (dirty data), and in which any two or more LLCs of the plurality of LLCs in that CPU are sharing the data.

Moreover, the second state HA_S, in combination with the first state LL_S, may take one of three states in which data in the M state is held in the CPU (LL_S/HA_S=M/E, E/M, M/M). These correspond to states 6, 7 and 8 in FIG. 5. These three states are described in detail hereinafter, but, for example, the data transitions to state 5 (LL_S/HA_S=E/E) when data is filled into the LLC in a certain core unit LCU, to state 6 (LL_S/HA_S=M/E) when that data is rewritten by a core in the same core unit, to state 7 (LL_S/HA_S=E/M) when data is transferred to an LLC of another core unit, and to state 8 (LL_S/HA_S=M/M) when the core in the core unit of the transfer destination is rewritten.

Furthermore, state 2 (LL_2/HA_S=S/S) means a state in which data is shared with another CPU, and if only one CPU holds the data independently and shares the data between a plurality of LLCs in that CPU, then there is a clean data sharing state, which is state 3 (S/A), or a dirty data sharing state, which is state 4 (S/Z).

In FIG. 5, the column "state of the CPU as viewed from the other CPU" means the state of the data in the CPU having a plurality of LLCs, in terms of a MESI state. In other words, this means a MESI state in a MESI protocol between a plurality of CPUs. As illustrated in FIG. 5, between the CPUs, state 1 (I/I) means an I state, state 2 (S/S) means an S state, state 3 (S/A) means an E state, state 4 (S/Z) means an M state, state 5 (E/E) means an E state, and states 6, 7 and 8 mean an M state.

The home agent HA determines the state of the CPU as viewed from the other CPU, on the basis of the combination of the first and second states of the first and second tags, and controls the cache in relation to the other CPU, by a normal MESI protocol. Consequently, even if the CPUs illustrated in FIG. 1 and the CPUs illustrated in FIG. 3 are mixed, it is possible to carry out cache control suitably.

[Example of Configuration of First Tag LL_TAG1 and Second Tag LL_TAG2]

Figure 6:
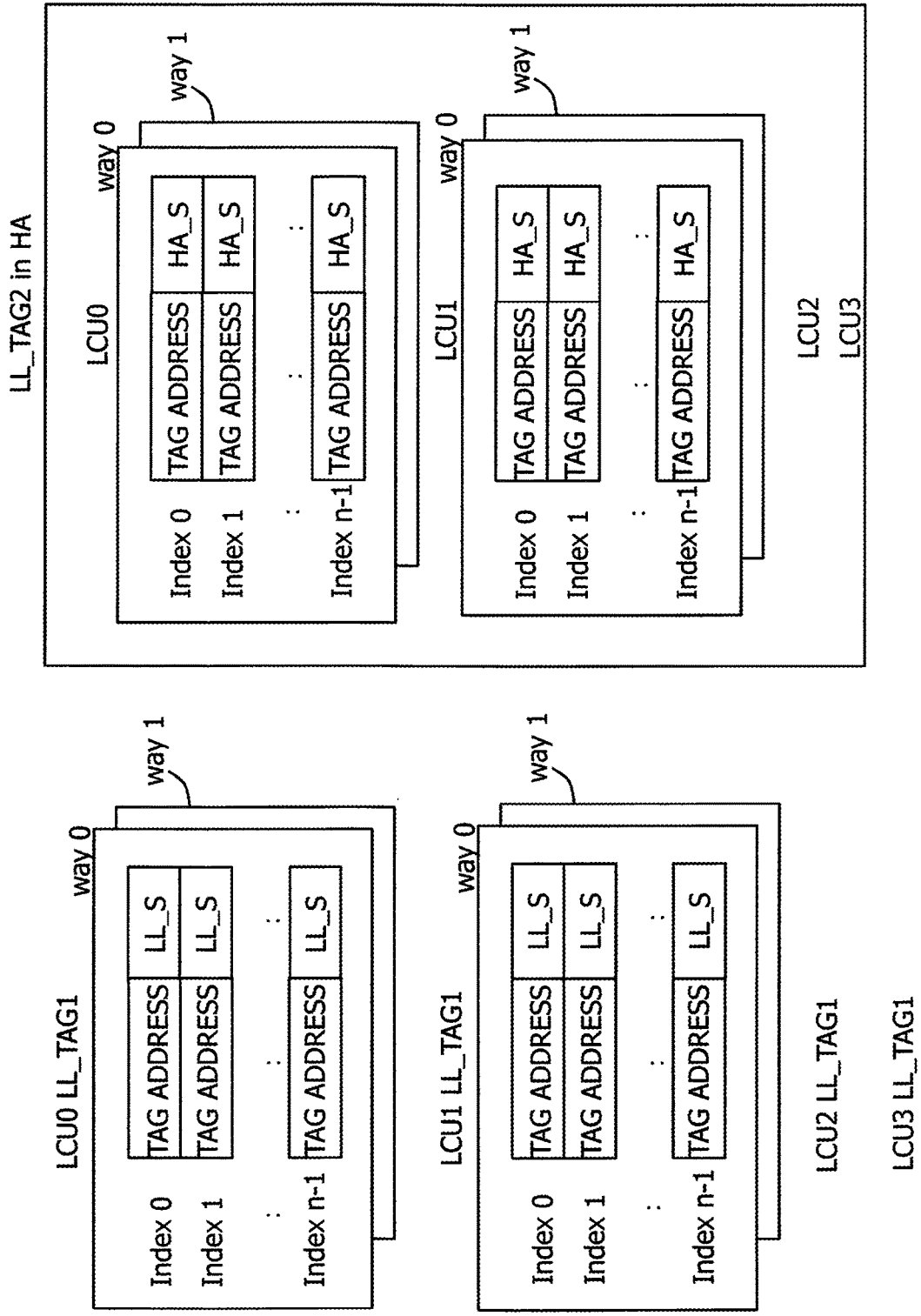
FIG. 6 is a diagram illustrating an example of the configuration of a first tag in a LLC and a second tag in a home agent HA according to the present embodiment.

FIG. 6 is a diagram illustrating an example of the configuration of a first tag in a LLC and a second tag in a home agent HA according to the present embodiment. It is presumed that the cache memory in the LLC is a two-way memory, and that each way has n cache blocks.

The left-hand side of FIG. 6 illustrates, by way of an example, the first tags LL_TAG1 in each of the LLCs of the four core units LCU0 to LCU3. In each of the first tags LL_TAG1, the first way, way 0, stores a tag address and first state LL_S, respectively for each of n cache blocks having index numbers from 0 to n−1. The second way, way 1, also has a similar configuration.

On the other hand, the right-hand side in FIG. 6 illustrates the second tag LL_TAG2 in the home agent HA. The second tag LL_TAG2 is provided to correspond to each LLC of the front windscreen four core units LCU0 to LCU3. The second tag which corresponds to the LLC of the core unit LCU0, among the second tags LL_TAG2, has two ways which store a tag address and a second state HA_S respectively for each one of n cache blocks having index numbers from 0 to n−1, similarly to the first tags LL_TAG1. The second tags corresponding to the LLCs of the remaining three core units LCU1 to LCU3 are similar to this. More specifically, the first tags LL_TAG1 and the second tags LL_TAG2 corresponding to the LLCs of the core units each have the same number of ways and the same number of cache blocks, and the tag addresses stored respectively therein are the same.

[Overall Image of Memory Access Process]

Figure 7:
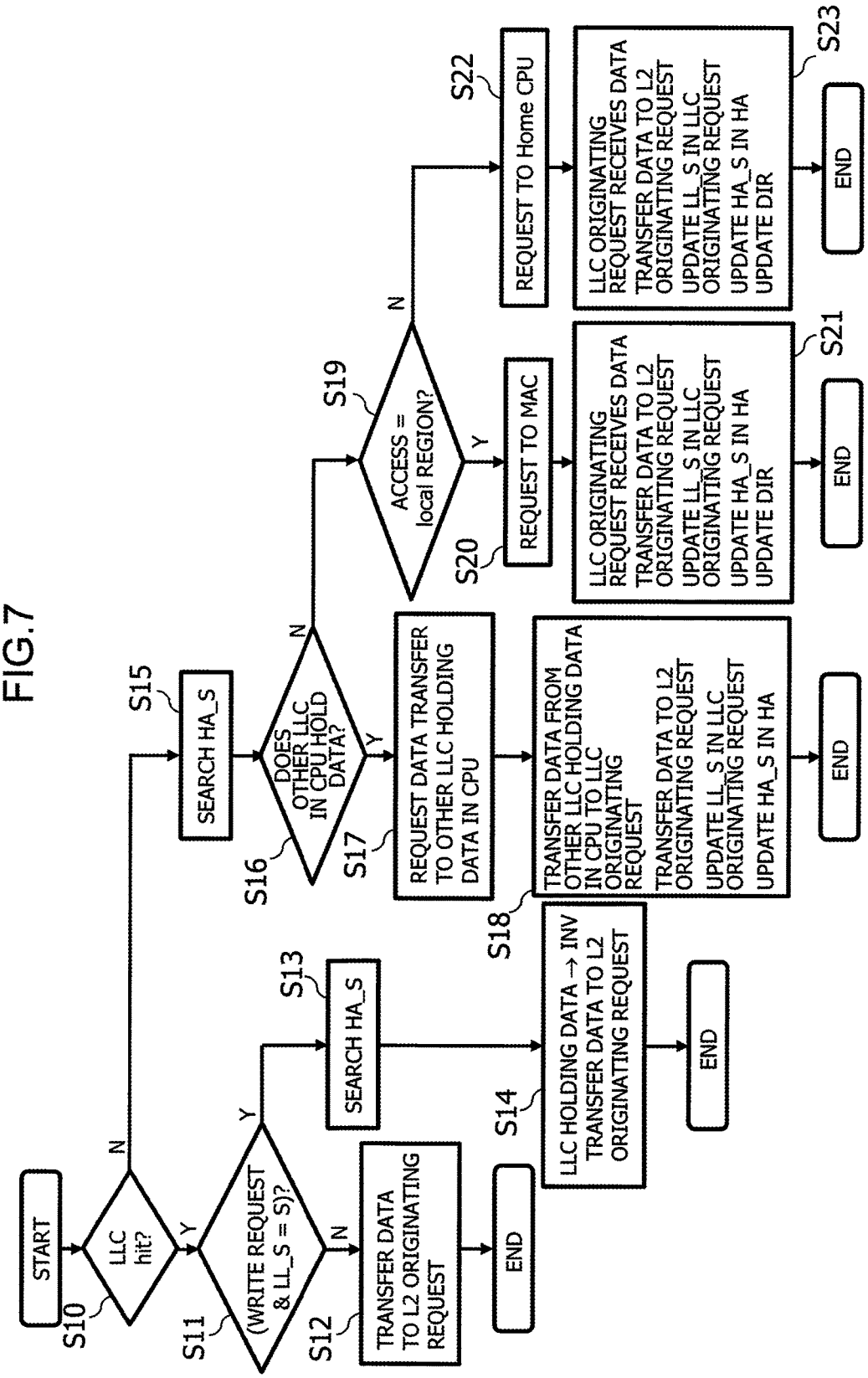
FIG. 7 is a flowchart diagram of a memory access process according to the present embodiment.

FIG. 7 is a flowchart diagram of a memory access process according to the present embodiment. For example, it is supposed that a core in the core unit LCU0 in the CPU0 in FIG. 3 has issued a load request (read request). The memory access process indicated below involves either: (1) receiving data from the LLC in the same core unit LCU0 as the core originating the request (S1.2); (2) receiving data from the LLC in a different core unit (S18); (3) receiving data from the main memory which is managed by the CPU0 of the requesting core (S21); or (4) receiving data from the main memory managed by a different CPU (S23). Furthermore, when the memory access process is a write-premised load request, then if the data is shared by a plurality of LLCs, the data is transferred, the data is discarded and the first state is set to the I state by the LLC that has shared the data, and in the LLC that originated the request, the first state is set to the E state, and the data is transferred to the L2 cache (S14).

Firstly, when a core in the core unit LCU0 of the CPU0 issues a load request, the L1 cache and the L2 cache in the core unit LCU0 both produce a cache miss, and the access request is input to the LLC in the core unit LCU0. This LLC searches the first tag LL_TAG1 and if it produces a cache hit (Y in S10), and if a condition in which the request is write-premised and the first state LL_S is S is not true (N in S11), then the LLC transfers the data in the data memory producing the hit, to the L2 cache originating the request (data response) (S12).

If the request producing a cache hit is a write-premised load request and the first state LL_S is S (Y at S11), then the HA searches the second tag LL_TAG2, and checks the second state HA_S to check whether another CPU is sharing the data in the core block producing the hit (HA_S=S), or whether another LLC is sharing that data (HA_S=A, Z) (S13). The HA then causes the LLC of another CPU or same CPU holding the data to discard the data, and change the first state LL_S of that LLC to the I state, and furthermore, causes the LLC of the LCU0 originating the request to transfer the data to the L2 cache originating the request, and change the first state LL_S of that LLC to the E state. Thereupon, the core in the LCU0 executes a write process. Since there is a need to change the state in the cache to the E state before writing, then a write-premised load request is carried out. This process corresponds to the write-premised load request (load request in E state) described below.

In step S10, if a cache miss occurs with the first tag of the LLC of the LCU0 (N at S10), then the LLC sends a request to the HA, causing the HA to search the second tag LL_TAG2 and check the second state HA_S, to check whether or not another LLC in the same CPU0 is holding the data, or whether or not another CPU is holding the data (S15).

As a result of the check in step S15, if another LLC inside the same CPU0 is holding the data (Y in S16), then the HA requests the other LLC which is holding that data to transfer the data to the LLC originating the request (S17). In response to this, a data transfer is carried out from the other LLC holding the data, to the LLC originating the request (data response), and subsequently, the data is transferred to the L2 cache originating the request, the first state LL_S of the first tag of the LLC originating the request is updated, and the second state HA_S of the second tag of the HA is also updated (S18).

On the other hand, if, as a result of the check in step S15, the other LLC in the same CPU0 is not holding data (N at S16), then access to the main memory is needed.

Therefore, if the access destination is a local region (an address region of the main memory managed by the CPU0 that has issued the request) (Y in S19), then the HA requests memory access to the memory access controller MAC (S20), and finally, the data read out from the main memory is sent from the memory access controller MAC to the LLC originating the request, the LLC originating the request receives the data, and subsequently, the data is transferred to the L2 cache originating the request (data response) (S21). Thereupon, the first state LL_S of the LLC originating the request and the second state HA_S of the HA are updated, and if there is a need, the directory DIR in the main memory is updated.

On the other hand, if the access destination is not a local region (N in S19), then data is requested of the home CPU which manages the main memory that is the access destination (S22). When the data is eventually transferred from the home CPU, the LLC originating the request in the CPU0 receives this data and transfers the data to the L2 cache originating the request (data response) (S23). Thereupon, the first state LL_S of the LLC originating the request and the second state HA_S of the HA are updated, and the directory DIR in the main memory of the home CPU is updated.

[State Transitions]

Figure 8:
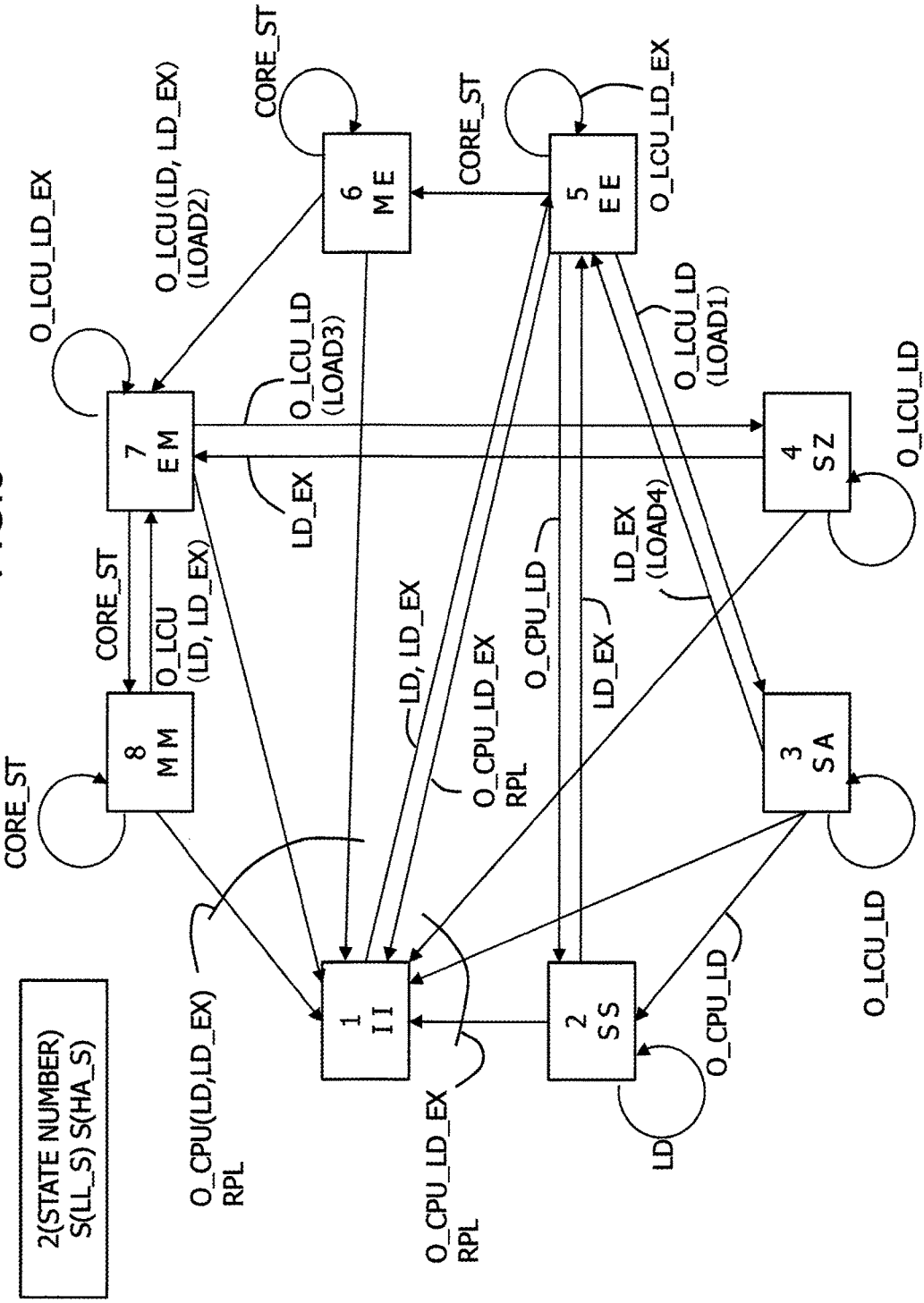
FIG. 8 is a diagram of transitions between the states 1 to 8 in FIG. 5.

FIG. 8 is a diagram of transitions between the states 1 to 8 in FIG. 5. In FIG. 8, the numbers in the squares indicate the respective states 1 to 8, and an indication such as "S S" represents the first state LL_S and the second state HA_S, respectively. Furthermore, the abbreviations which indicate the operational causes of the state transitions are as follows.

LD: load (read)
ST: store (write)
RPL: replace (process for evicting data in cache)
LD_EX: store-premised load (write-premised read, exclusive load)
O_CPU: processing by other CPU
O_LCU: processing by other core unit LCU
CORE: processing by core in same core unit LCU Furthermore, the store-premised load by the other CPU O_CPU_LD_EX is the same operation as replace RPL, and transitions to the I state (State 1). The load O_CPU_LD by another CPU from states 6, 7 and 8 is the same operation as replace RPL, and transitions to the I state (State 1).

Of the states 1 to 8, the initial state is state 1 (I/I). In state 1, if a load request LD or a store-premised load LD_EX is executed and data is filled into a cache block in state 1 (I/I), then the state transfers from state 1 to state 5 (E/E). State 5 does not transfer to another state even if a store-premised load O_LCU_LD_EX is executed by another core unit LCU.

Next, when a store by a core CORE_ST is executed in a cache block in state 5 (E/E), the data is rewritten to become dirty data, and the state transitions to state 6 (M/E). State 6 does not transfer to another state even if a store by a core CORE_ST is executed again.

In state 6 (M/E), if a load by another LCU O_LCD_LD or a store-premised load by another LCU O_LCU_LD_EX is executed, then the state transitions to state 7 (E/M). This corresponds to load 2 described below. State 7 does not transition to another state even if a store-premised load by another LCU O_LCU_LD_EX is executed again.

If store by a core CORE_ST is executed in state 7 (E/M), then state 7 transitions to state 8 (M/M). Conversely, in state 8 (M/M), if a load or store-premised load by another LCU is executed, then the state returns to state 7. State 8 does not transfer to another state even if a store by a core CORE_ST is executed.

In state 7 (E/M), when a load is executed by another LCU, the state transitions to state 4 (S/Z). This corresponds to load 3 described below. State 4 does not transition to another state, if a load O_LCU_LD is executed by another LCU.

In state 5 (E/E), when a load by another LCU O_LCU_LD is executed, the state transitions to state 3 (S/A). This corresponds to load 1 described below. Thereafter, state 3 does not transition to another state even if a load by another LCU is executed. In state 3, when a stored-promised load LD_EX is executed, then the state transitions to state 5. This corresponds to the store-premised load 4 described below.

In state 5 (E/E), when a load by another CPU O_CPU_LD is executed, the state transitions to state 2 (S/S). State 2 is maintained, even if the load is repeated. Conversely, if the store-premised load LD_EX is executed in state 2 (S/S), the state transitions to state 5 (E/E).

In states 2 to 5, when a store-premised load by another CPU O_CPU_LD_EX or replace RPL is executed, then the state transitions to state 1. Furthermore, in states 6, 7 and 8, when a load by another CPU O_CPU_LD or store-premised load by another CPU O_CPU_LD_EX or replace RPL is executed, then the state transitions to state 1. These transitions accompany the eviction of data in the cache block, and when there is no longer any data in the cache block than the state transitions to the I state.

[Example of Directory]

FIG. 9 is a diagram illustrating an example of a directory stored in the main memory. As stated above, the directory stores any one of the following states in correspondence with addresses in each cache block: the state L (Local) in which no CPU has taken out data; the state R-EX (Remote Exclusive) in which only one CPU has taken out data; and the state R-SH (Remote Share) in which a plurality of CPUs have taken out data. Moreover, the directory also includes information about the object CPU which indicates which CPU corresponds to each of the states. In the example illustrated in FIG. 9, in the case of an information processing system in which sixteen CPUs are mutually connected, the information about the object CPU is expressed as a 16-bit sequence, for instance, in which the object CPU is indicated as "1", another CPU, as "0" and the same CPU holding the directory, as "-".

In the example in FIG. 9, the home CPU (H-CPU) is CPU[1], and it is possible to tell whether or not the data in the memory managed by the home CPU has been taken out by the cache of the same CPU holding the directory, by referring to the state of the cache tag, and therefore the CPU[1] is indicated as "-" in the 16-bit sequence. In the example in FIG. 9, the data of the cache block at the address ADD1 has been taken out by CPU[15], the data at address ADD2 has not been taken out by any CPU, the data at address ADD3 has been taken out CPU[14] and CPU[2], and the data at address ADD4 has been taken out by all of the other CPUs.

[Operation of Load Request in Present Embodiment]

Next, the operations according to the four types of load and replace operation illustrated in the transition diagram in FIG. 8 will be described in detail. There follows a simple description of two store and three load operations. It is presumed that the arithmetic processing devices CPU according to the present embodiment have four core units LCU0 to LCU3, as illustrated in FIG. 3. Furthermore, a plurality of CPUs including at least a local CPU and a home CPU are mutually connected via a CPU bus.

[Load 1]

Figure 10:
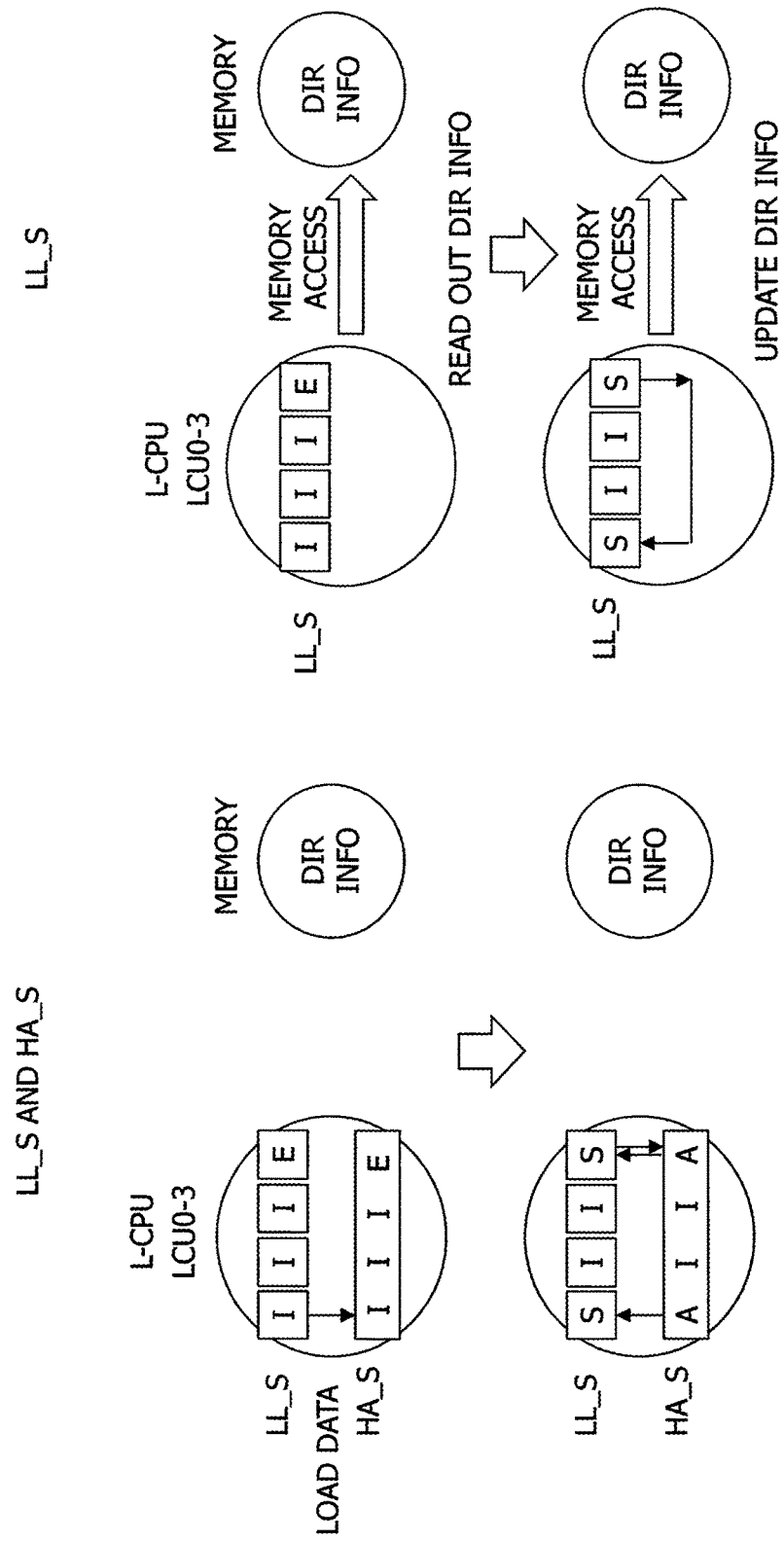
FIG. 10 is a diagram illustrating a load 1 operation in which a core in LCU0 in the local CPU (L-CPU) loads data in the E state in the LLC of LCU3, to the LLC of LCU0.

FIG. 10 is a diagram illustrating a load 1 operation in which a core in LCU0 in the local CPU (L-CPU) loads data in the E state in the LLC of LCU3, to the LLC of LCU0. The left-hand side of FIG. 10 illustrates an operation based on a cache protocol using the first state LL_S and the second state HA_S according to the present embodiment, and depicts the states of the first state LL_S of the LLCs of LCU0 to LCU3 of the local CPU (L-CPU), and the second state HA_S of the HA, before and after transition. The right-hand side of FIG. 10 illustrates an operation based on a cache protocol using only the first state LL_S, in a configuration in which the LLCs in the CPU illustrated in FIG. 3 are divided up for each of a plurality of core groups LCU. In other words, the example on the right-hand side is illustrated for the purpose of comparison with the present embodiment.

Figure 11:
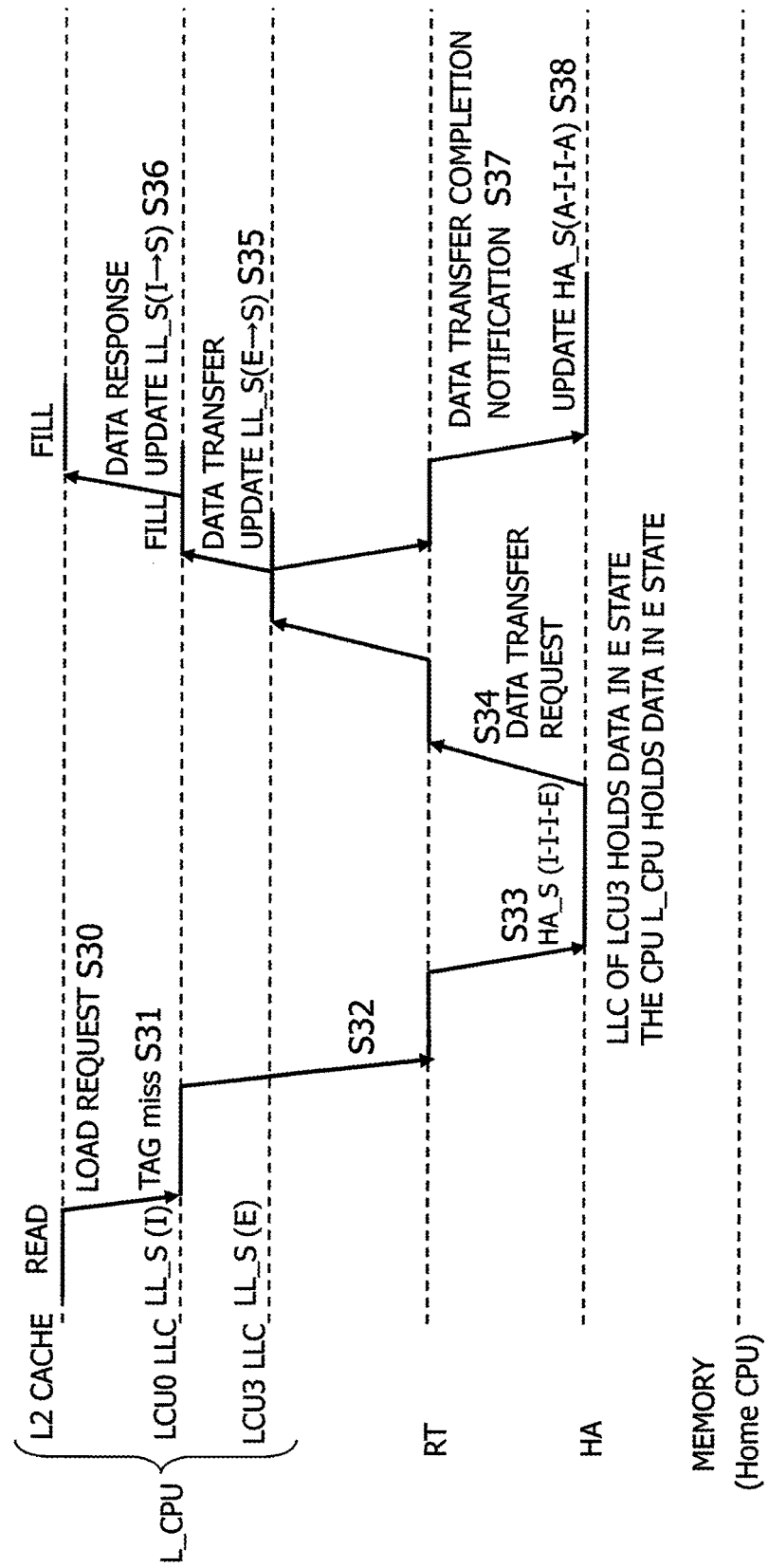
FIG. 11 is a diagram illustrating a load 1 operation based on a cache protocol using the first state LL_S and the second state HA_S according to the present embodiment.

FIG. 11 is a diagram illustrating a load 1 operation based on a cache protocol using the first state LL_S and the second state HA_S according to the present embodiment. As illustrated in the left-hand side of the FIG. 10, load 1 is an operation in which, when the LLC of the LCU3 of the local L-CPU is storing data in the E state, a core of LCU0 issues a load request and fills data into the LLC of LCU0. In other words, by load 1, a cache block of the LLC in LCU3 transitions from state 5 (E/E) to state 3 (S/A).

In FIG. 11, the core of LCU0 issues a load request and the load request is issued to the LLC by the L2 cache (S30). The LLC of LCU0 searches the first tag LL_TAG1 and produces a cache miss (S31). The LLC of the LCU0 issues a load request to the HA via the router RT (S32), and the HA searches the second tag LL_TAG2. As a result of this, the HA detects that the second state HA_S of the cache blocks corresponding to the access destination address in the four core units LCU0 to LCU3 is I-I-I-E, and therefore that the LLC of LCU3 is holding the data in the E state, and the CPU (L_CPU) is holding the data in the E state (S33). As a result of this, the HA issues a data transfer request to the LLC of LCU3 (S34), to request transfer of the data in the LLC of LCU3, to the LLC of LCU0.

In response to this data transfer request S34, the (pipeline circuit of the) LLC of LCU3 transfers the data held therein to the LLC of LCU0, via the router RT, and updates the first state LL_S from E to S (S35). In response to this data transfer, the (pipeline circuit of the) LLC of LCU0 fills (registers) with the received data in the cache memory, responds with this data to the L2 cache, and updates the first state LL_S from I to S (S36). The L2 cache fills with the data in the data response in the cache memory.

On the other hand, the (pipeline circuit) of the LLC of LCU3 issues a data transfer completion notification to the HA (S37), and in response to this, the HA updates the second state HA_S in the second tag LL_TAG2, to "A-I-I-A" (S38). In this series of processes, no access is made to the memory of the home CPU (H-CPU).

Figure 12:
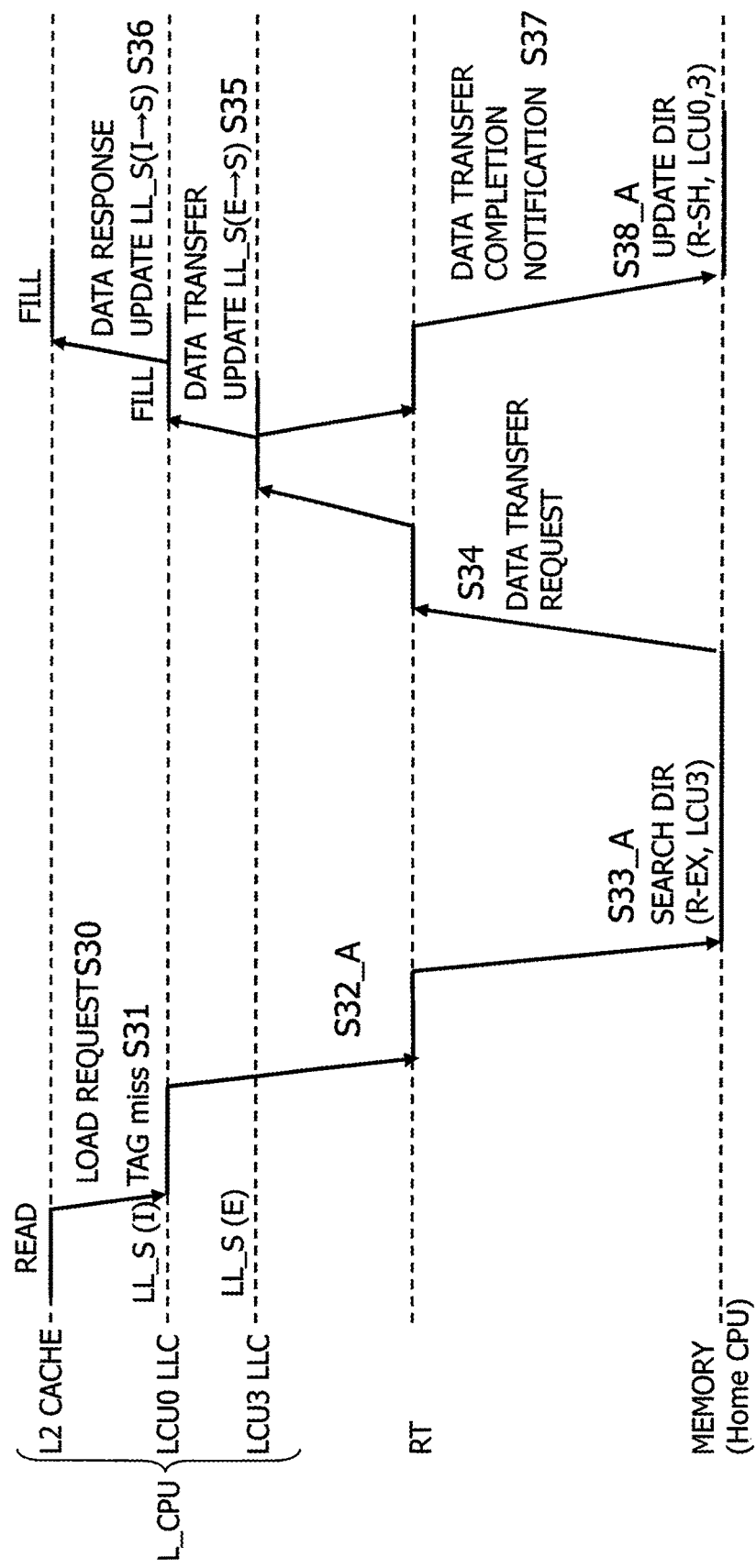
FIG. 12 is a diagram illustrating a load 1 operation based on a cache protocol using the first state LL_S (comparative example)

FIG. 12 is a diagram illustrating a load 1 operation based on a cache protocol using the first state LL_S (comparative example). As illustrated in the right-hand side of the FIG. 10, in the load 1 operation, when the LLC of the LCU3 of the local L-CPU is storing data in the E state, a core of LCU0 issues a load request and fills data into the LLC of LCU0. In FIG. 12, the same processes as FIG. 11 are labelled with the same reference numerals, and corresponding processes are labelled with the same reference numeral plus the suffix A.

In FIG. 12, a load request is issued to the LLC from the L2 cache of LCU0 in CPU0, which is a local L-CPU (S30), and the LLC of LCU0 searches the first tag LL_TAG1 and produces a cache miss (S31). The LLC of LCU0 issues a fetch request to the home CPU (S32_A), and the MAC of the home CPU searches the directory DIR in the memory (S33_A). As a result of this, the home CPU detects that a remote CPU (here, the remote CPU is the same as the local L-CPU) is holding the data in an E state and that the LCU3 is holding the data. Here, it is assumed that the object CPU information in the directory in FIG. 9 also includes object CPU and object core unit LCU information. As a result of this, the HA of the home CPU issues a data transfer request to the LLC of LCU3 of the remote CPU (the local CPU, CPU0) (S34), and requests transfer of the data in the LLC of LCU3, to the LLC of LCU0.

The processing thereafter is similar to FIG. 11 (S35, S36), and when LCU3 in the local L-CPU sends the data transfer completion notification to the home H-CPU (S37), then the home H-CPU updates the directory in such a manner that LCU0 and LCU3 of the local L-CPU share the data (S38_A).

In this way, when the second state HA_S is not used, there arises a need to access the directory in the memory managed by the home H-CPU, two times. On the other hand, with the cache protocol according to the present embodiment which uses the second state HA_S in addition to the first state LL_S in FIG. 11, no memory access occurs. In other words, according to the present embodiment, since the home agent HA manages the second state HA_S of a plurality of LLCs, then it is possible to complete processing within the local L-CPU, as far as possible.

[Load 2]

Figure 13:
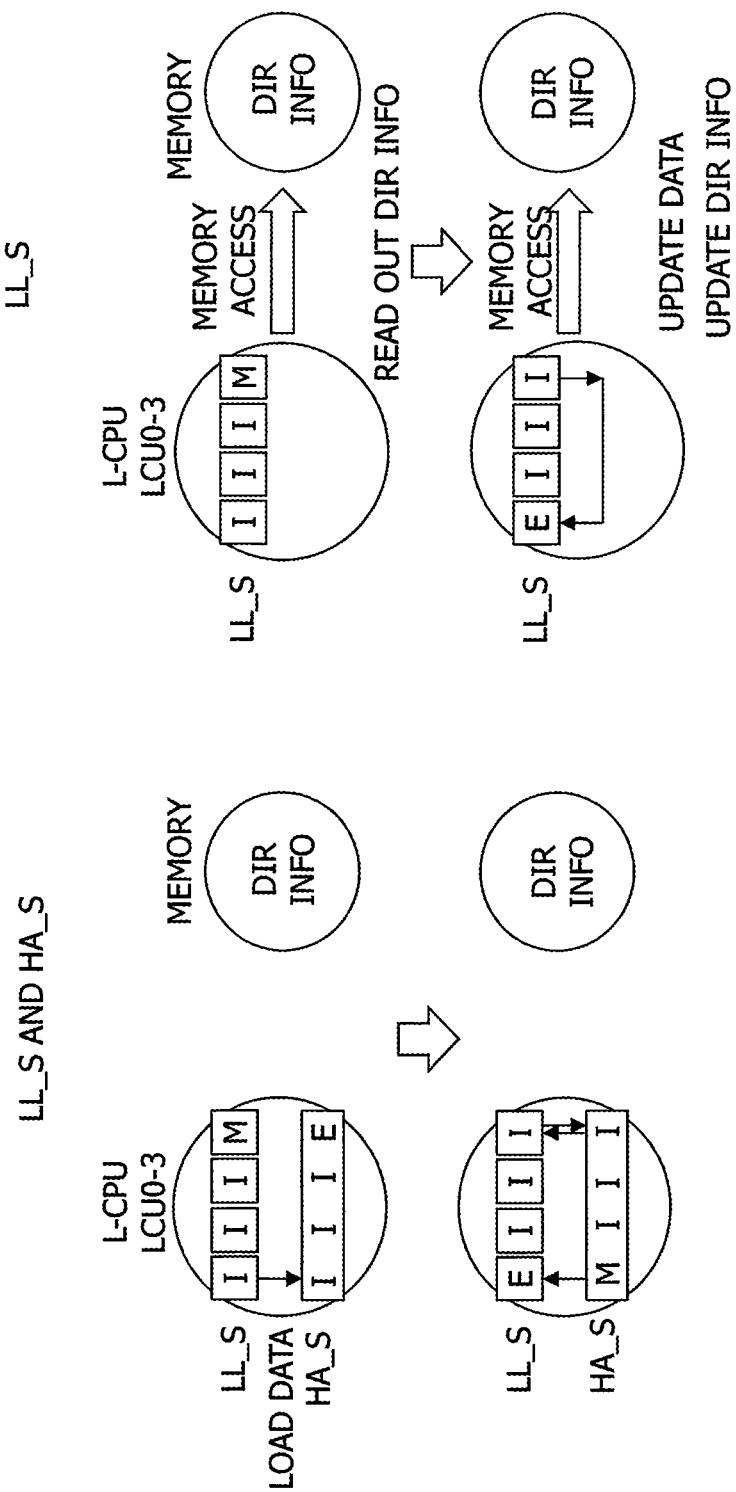
FIG. 13 is a diagram illustrating a load 2 operation in which a core in LCU0 in the local CPU (L-CPU) loads data in the M state located in the LLC of LCU3, to the LLC of LCU0.

FIG. 13 is a diagram illustrating a load 2 operation in which a core in LCU0 in the local CPU (L-CPU) loads data in the M state located in the LLC of LCU3, to the LLC of LCU0. Similarly to FIG. 10, the left-hand side illustrates a cache protocol operation using the first state LL_S and the second state HA_S according to the present embodiment, and the right-hand side illustrates a cache protocol operation using only the first state LL_S.

Figure 14:
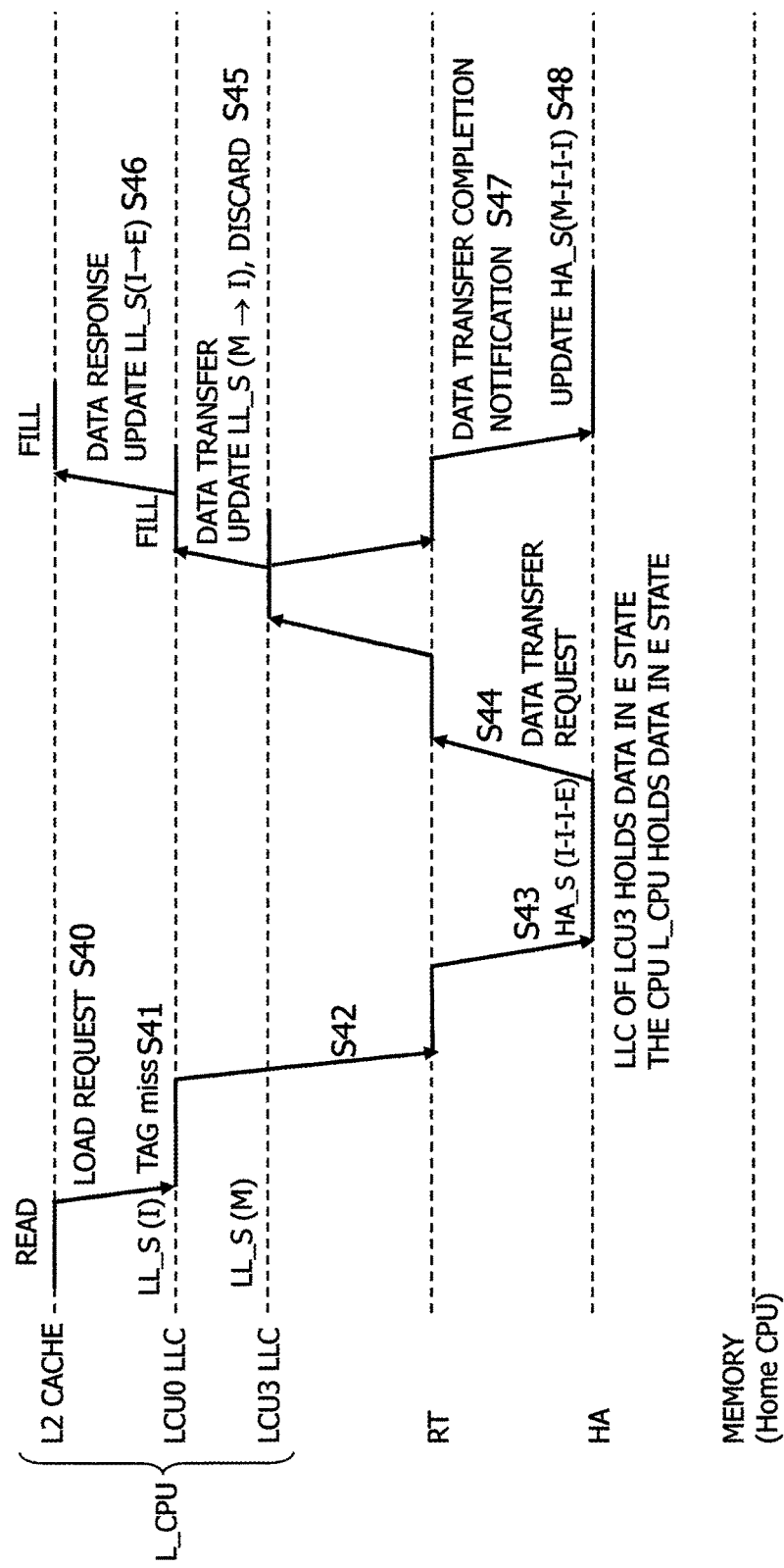
FIG. 14 is a diagram illustrating a load 2 operation based on a cache protocol using the first state LL_S and the second state HA_S according to the present embodiment.

FIG. 14 is a diagram illustrating a load 2 operation based on a cache protocol using the first state LL_S and the second state HA_S according to the present embodiment. As illustrated in the left-hand side of FIG. 13, load 2 is an operation in which, when the LLC of the LCU3 of the local L-CPU is storing data in the M state, a core of LCU0 issues a load request and fills data into the LLC of LCU0. In other words, by load 2, the state of the data transitions from state 6 (M/E) of the LLC of LCU3 to state 7 (E/M) of the LLC of LCU0.

In FIG. 14, the core of LCU0 issues a load request and the load request is issued to the LLC from the L2 cache (S40). The LLC of LCU0 searches the first tag LL_TAG1 and produces a cache miss (S41). The LLC of the LCU0 issues a load request to the HA (S42), and the HA searches the second tag LL_TAG2 (S43). As a result of this, the HA detects that the second state HA_S of the cache blocks corresponding to the access destination address in the four core units LCU0 to LCU3 is I-I-I-E, and therefore that the LLC of LCU3 is holding the data in the E state, and the CPU (L_CPU) is holding the data in the E state. As a result of this, the HA issues a data transfer request to the LLC of LCU3 (S44), to request transfer of the data in the LLC of LCU3, to the LLC of LCU0.

In response to this data transfer request S44, the LLC of LCU3 transfers the data held therein to the LLC of LCU0 via the router RT, and since the first state LL_S is the M state, the data is discarded by a normal MESI protocol and the first state LL_S is updated from M to I (S45). In response to this data transfer, the LLC of LCU0 is filled (registered) with the received data, responds with this data to the L2 cache, and updates the first state LL_S from I to E (S46). Due to this data response, the L2 cache is filled with the data.

On the other hand, the LLC of LCU3 issues a data transfer completion notification to the HA (S47), and in response to this, the HA updates the second state HA_S in the second tag LL_TAG2, to "M-I-I-I" (S48). In this series of processes, no access is made to the memory of the home CPU (H-CPU). In particular, the LLC of LCU3 does not write-back the data in the M state, to the memory.

Figure 15:
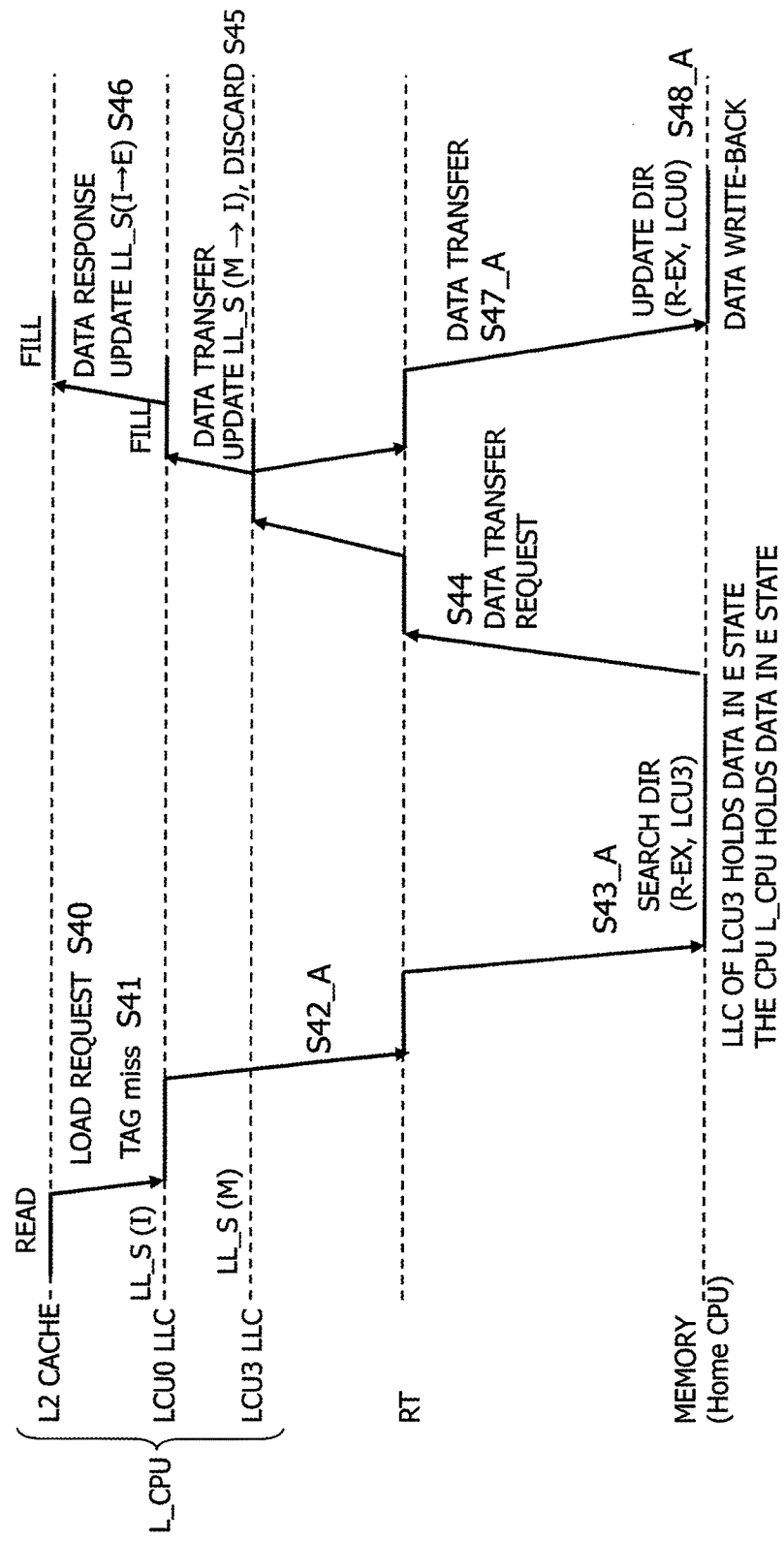
FIG. 15 is a diagram illustrating a load 2 operation based on a cache protocol using the first state LL_S (comparative example)

FIG. 15 is a diagram illustrating a load 2 operation based on a cache protocol using the first state LL_S (comparative example). As illustrated in the right-hand side of the FIG. 13, in the load 2 operation, when the LLC of the LCU3 of the local L-CPU is storing data in the M state, a core of LCU0 issues a load request and fills data into the LLC of LCU0.

In FIG. 15, a load request is issued to the LLC from the L2 cache of the LCU0 in the local L-CPU (S40). The LLC of LCU0 searches the first tag LL_TAG1 and produces a cache miss (S41). The LLC of LCU0 issues a fetch request to the home CPU (S42_A), and the MAC of the home CPU searches the directory DIR in the memory (S43_A). As a result of this, the home CPU detects that LCU3 in the remote CPU (which is the same as the local L-CPU) is holding the data in the E state. Consequently, the HA of the home H-CPU issues a data transfer request to the LLC of LCU3 in the local L-CPU (S44), and requests transfer of the data in the LLC of LCU3, to the LLC of LCU0.

Thereafter, similar processing to that in FIG. 14 is carried out (S45, S46), the LCU3 in the local L-CPU transfers data to the home H-CPU (S47_A), the home H-CPU updates the directory so that LCU0 in the local L-CPU is holding the data in the E state, and the data is written back (S48_A).

In this way, when the second state HA_S is not used, there arises a need to access the memory managed by the home H-CPU, two times, and to refer to and change the directory, and write-back data. On the other hand, with the cache protocol using the first state LL_S and the second state HA_S illustrated in FIG. 14, no memory access occurs. In other words, according to the present embodiment, since the home agent HA manages the second state HA_S of a plurality of LLCs, then it is possible to complete processing within the local L-CPU, as far as possible.

[Load 3]

Figure 16:
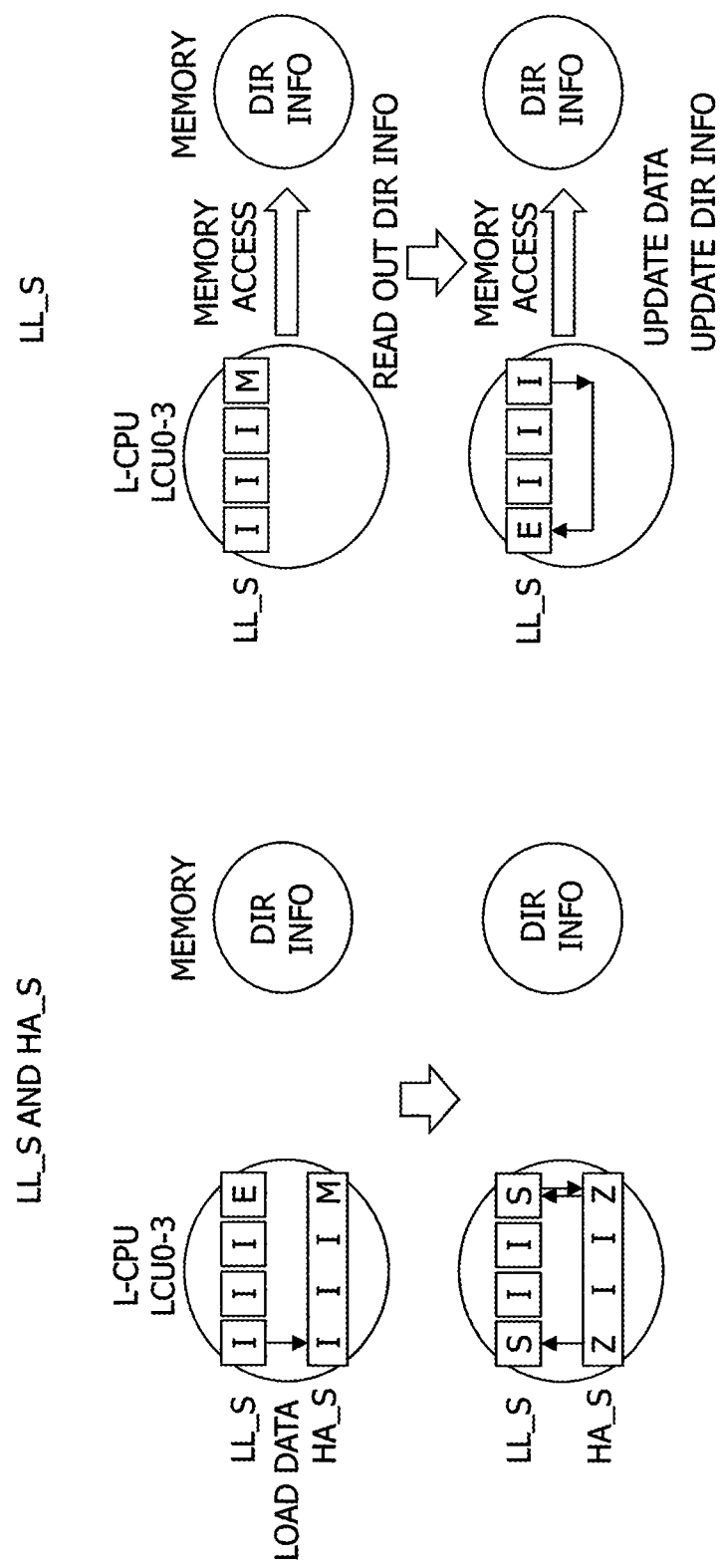
FIG. 16 is a diagram illustrating a load 3 operation in which a core in LCU0 in the local CPU (L-CPU) loads data in the E state located in the LLC of LCU3.

FIG. 16 is a diagram illustrating a load 3 operation in which a core in LCU0 in the local CPU (L-CPU) loads data in the E state located in the LLC of LCU3. In FIG. 16, the left-hand side illustrates a cache protocol operation using the first state LL_S and the second state HA_S according to the present embodiment, and the right-hand side illustrates a cache protocol operation using only the first state LL_S.

Figure 17:
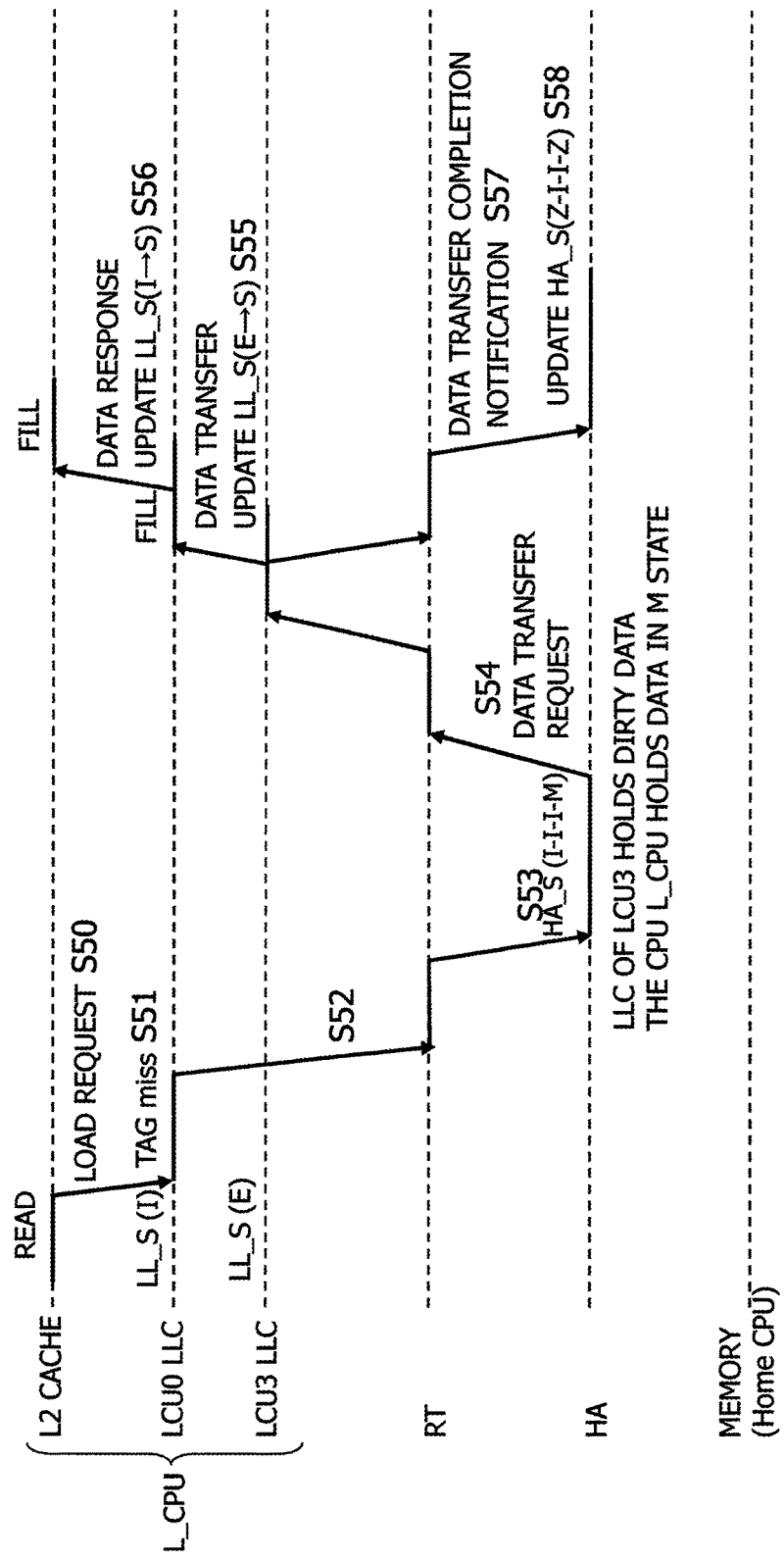
FIG. 17 is a diagram illustrating a load 3 operation based on a cache protocol using the first state LL_S and the second state HA_S according to the present embodiment.

FIG. 17 is a diagram illustrating a load 3 operation based on a cache protocol using the first state LL_S and the second state HA_S according to the present embodiment. As illustrated in the left-hand side of the FIG. 16, load 3 is an operation in which, when the LLC of the LCU3 of the local L-CPU is storing data in the E state, a core of LCU0 issues a load request and fills data into the LLC of LCU0. In other words, by load 3, a cache block of the LLC in LCU3 transitions from state 7 (E/M) to state 4 (S/Z).

In FIG. 17, the core of LCU0 in the local L-CPU issues a load request and the load request is issued to the LLC from the L2 cache (S50). The LLC of LCU0 searches the first tag LL_TAG1 and produces a cache miss (S51). The LLC of the LCU0 issues a load request to the HA (S52), and the HA searches the second tag LL_TAG2 (S53). As a result of this, the HA detects that the LLC of LCU3 is holding dirty data and the CPU (L_CPU) is holding data in the M state, on the basis of the fact that the second state HA_S of the LLCs of the four core units LCU0 to LCU3 is I-I-I-M. As a result of this, the HA issues a data transfer request to the LLC of LCU3 (S54) and requests transfer of the data in the LLC of LCU3, to the LLC of LCU0.

In response to this data transfer request S54, the LLC of LCU3 transfers the data to the LLC of LCU0, via the router RT, and the first state LL_S is updated from E to S (S55). In response to this data transfer, the LLC of LCU0 is filled with the received data, responds with this data to the L2 cache, and updates the first state LL_S from I to S (S56). Due to this data response, the L2 cache is filled with the data.

On the other hand, the LLC of LCU3 issues a data transfer completion notification to the HA (S57), and in response to this, the HA updates the second state HA_S in the second tag LL_TAG2, to "Z-I-I-Z". In this series of processes, no access is made to the memory of the home CPU (H-CPU).

Figure 18:
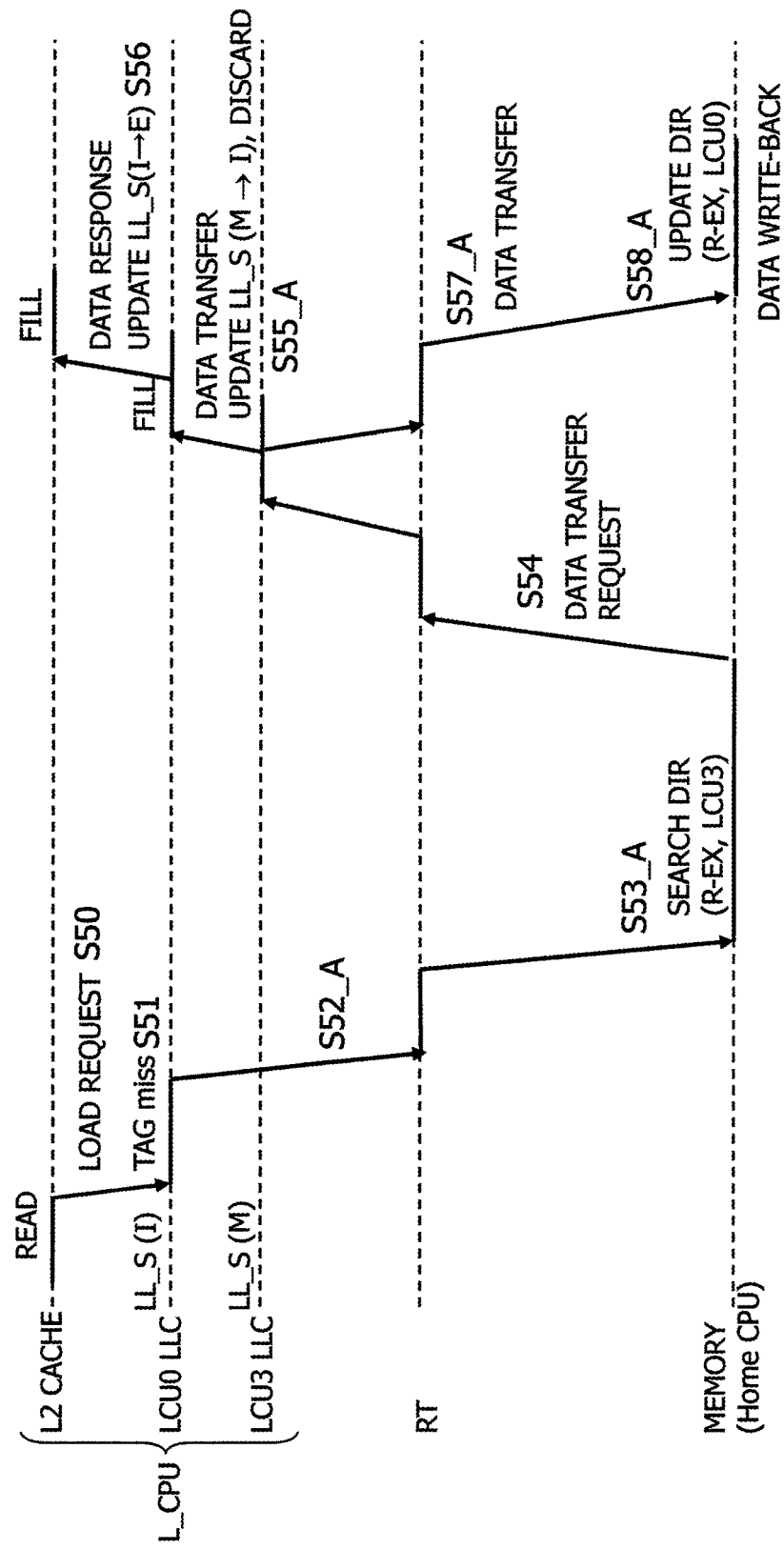
FIG. 18 is a diagram illustrating a load 3 operation based on a cache protocol using the first state LL_S (comparative example)

FIG. 18 is a diagram illustrating a load 3 operation based on a cache protocol using the first state LL_S (comparative example). As illustrated in the right-hand side of the FIG. 16, in the load 3 operation, when the LLC of the LCU3 of the local L-CPU is storing data in the M state, a core of LCU0 issues a load request and fills data into the LLC of LCU0.

In FIG. 18, a load request is issued to the LLC from the L2 cache of the LCU0 in the local L-CPU (S50). The LLC of LCU0 produces a cache miss (S51). The LLC of LCU0 issues a fetch request to the home CPU (S52_A), and the MAC of the home CPU searches the directory DIR in the memory (S53_A). As a result of this, the home CPU detects that the remote CPU (which is the same as the local L-CPU) is holding the data in the E state, and that LCU3 of L_CPU is holding the data. Consequently, the HA of the home H-CPU issues a data transfer request to the LLC of LCU3 in the local L-CPU (S54), and requests transfer of the data in the LLC of LCU3, to the LLC of LCU0.

Thereupon, the LLC of LCU3 transfers the data to the LLC of LCU0, evicts the data, because the first state LL_S is the M state, and updates the first state LL_S from M to I (S55_A). Moreover, the LLC of LCU0 is filled with the transferred data, updates the first state LL_S from I to E, and responds with the data to the L2 cache (S56). Moreover, since LCU3 in the local L-CPU was in the M state, the data evicted by the MESI protocol is transferred to the home H-CPU (S57_A). In response to this, the home H-CPU updates the directory so that LCU0 in the local L-CPU is holding the data, and writes back the data (S58_A).

In this way, when the second state HA_S is not used, there arises a need to access the memory managed by the home H-CPU, two times, and to refer to and change the directory, and write-back data. On the other hand, with the cache protocol using the first state LL_S and the second state HA_S illustrated in FIG. 17, no memory access occurs. According to the present embodiment, since the home agent HA manages the second state HA_S of a plurality of LLCs, then it is possible to complete processing within the local L-CPU, as far as possible.

[Store-Premised Load 4 (Load in the E State)]

Figure 19:
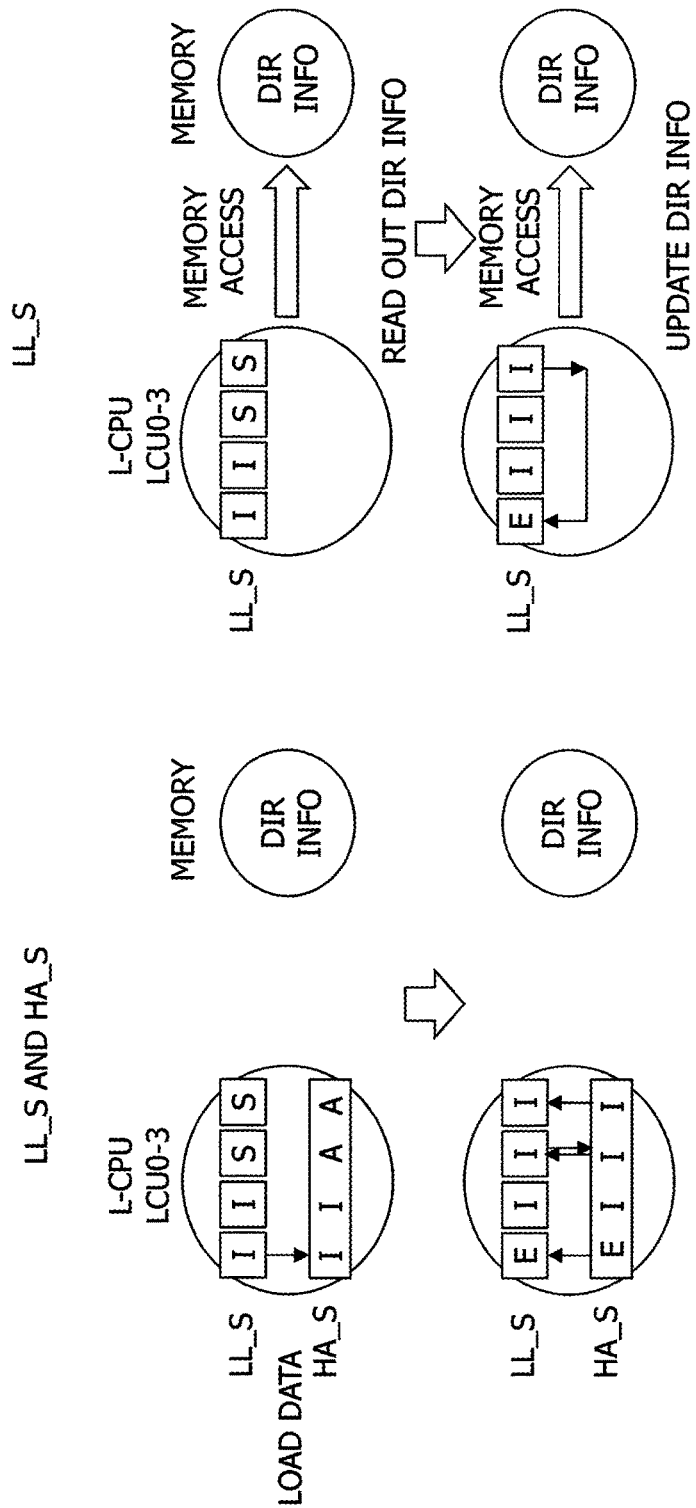
FIG. 19 is a diagram illustrating a store-premised load 4 operation in which a core in LCU0 in the local CPU (L-CPU) exclusively loads data in the S state located in the LLCs of LCU2 and LCU3, to the LLC of LCU0.

FIG. 19 is a diagram illustrating a store-premised load 4 operation in which a core in LCU0 in the local CPU (L-CPU) exclusively loads data in the S state located in the LLCs of LCU2 and LCU3, to the LLC of LCU0. In FIG. 19, the left-hand side illustrates a cache protocol operation using the first state LL_S and the second state HA_S, and the right-hand side illustrates a cache protocol operation using only the first state LL_S.

Figure 20:
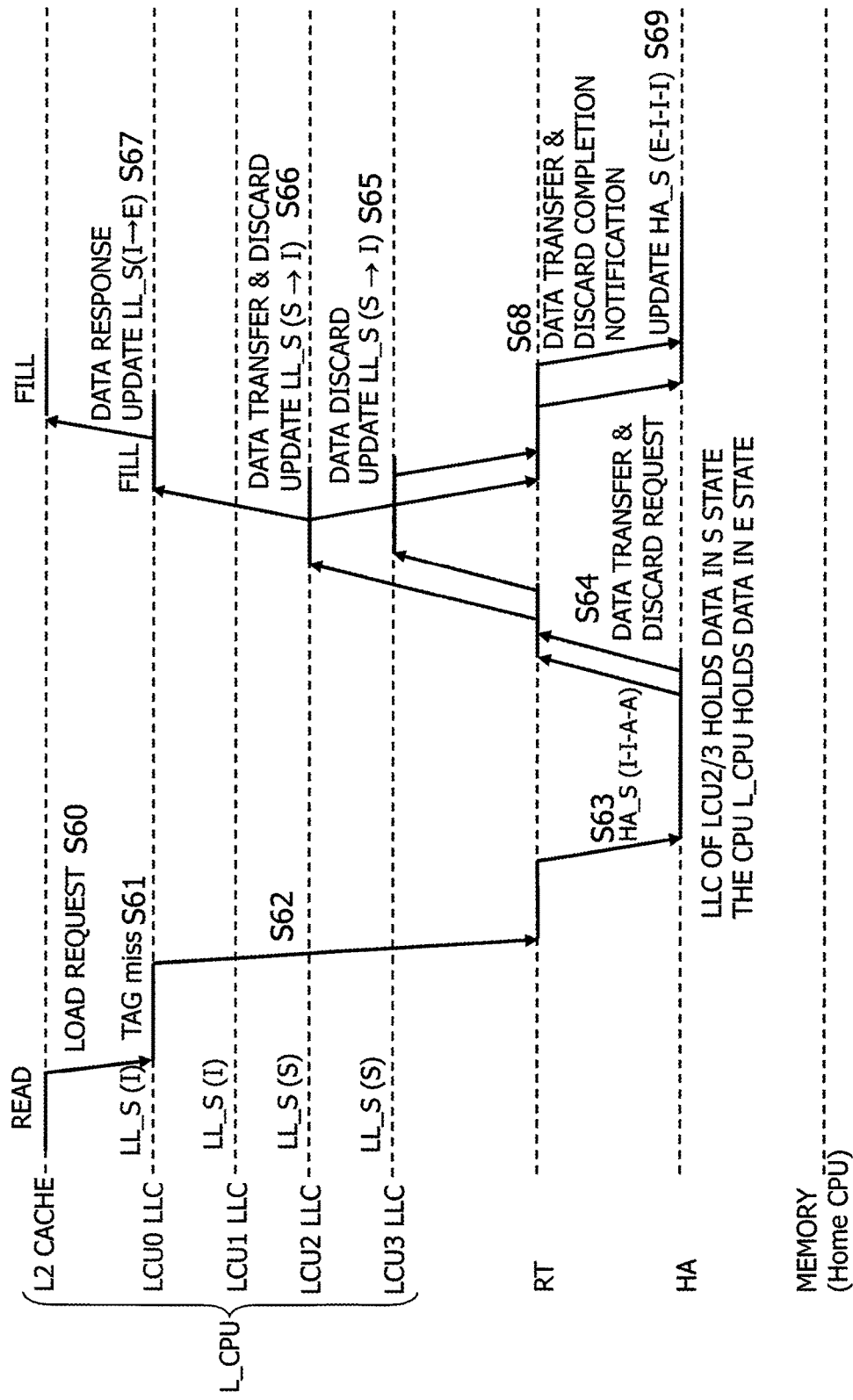
FIG. 20 is a diagram illustrating a store-premised load 4 operation based on a cache protocol using the first state LL_S and the second state HA_S according to the present embodiment.

FIG. 20 is a diagram illustrating a store-premised load 4 operation based on a cache protocol using the first state LL_S and the second state HA_S according to the present embodiment. As illustrated in the left-hand side of the FIG. 19, the store-premised load 4 is an operation in which, when the LLCs of LCU2 and LCU3 of the local L-CPU are storing data in the S state, a core of LCU0 issues a store-premised load request and fills the data into the LLC of LCU0, in the E state. In other words, the store-premised load request involves changing the S state of the LLC holding the data, to the I state, and holding this data in the E state in the LLC which newly holds the data. As a result of this, after this load, the core is able to rewrite the data in the LLC due to E state, at the appropriate timing. By the store-premised load 4, the state of the data transitions from state 3 (S/A) of the LLCs of LCU2 and LCU3 to state 5 (E/E) of the LLC of LCU0.

In FIG. 20, the core of LCU0 in the local L-CPU issues a load request and the L2 cache issues a load request to the LLC (S60). The LLC of LCU0 searches the first tag LL_TAG1 and produces a cache miss (S61). The LLC of LCU0 issues a load request to the HA (S62), and the HA searches the second tag LL_TAG2 (S63). As a result of this, the HA detects that the second state HA_S of the LLCs of the four core units LCU0 to LCU3 is I-I-A-A, and hence that the LLCs of LCU2 and LCU3 are sharing clean data and the CPU is holding data in the E state. Consequently, the HA issues a data transfer and discard request to the LLC of LCU2 and issues a discard request to the LLC of LCU3 (S64), and thereby requests transfer of the data in the LLC of LCU2 to the LLC of LCU0.

In response to this data transfer and discard request, the LLC of LCU3 discards the data and updates the first state LL_S from S to I (S65), and the LLC of LCU2 transfers the data to the LLC of LCU0 via the router RT, discards the data and updates the first state LL_S from S to I (S66). In response to this data transfer, the LLC of LCU0 is filled with the received data, responds with this data to the L2 cache, and updates the first state LL_S from I to E (S67). Due to this data response, the L2 cache is filled with the data.

On the other hand, the LLCs of LCU2 and LCU3 issue a data transfer and discard completion notification to the HA (S68), and in response to this, the HA updates the second state HA_S in the second tag LL_TAG2, to "E-I-I-I". In this series of processes, no access is made to the memory of the home CPU (H-CPU).

Figure 21:
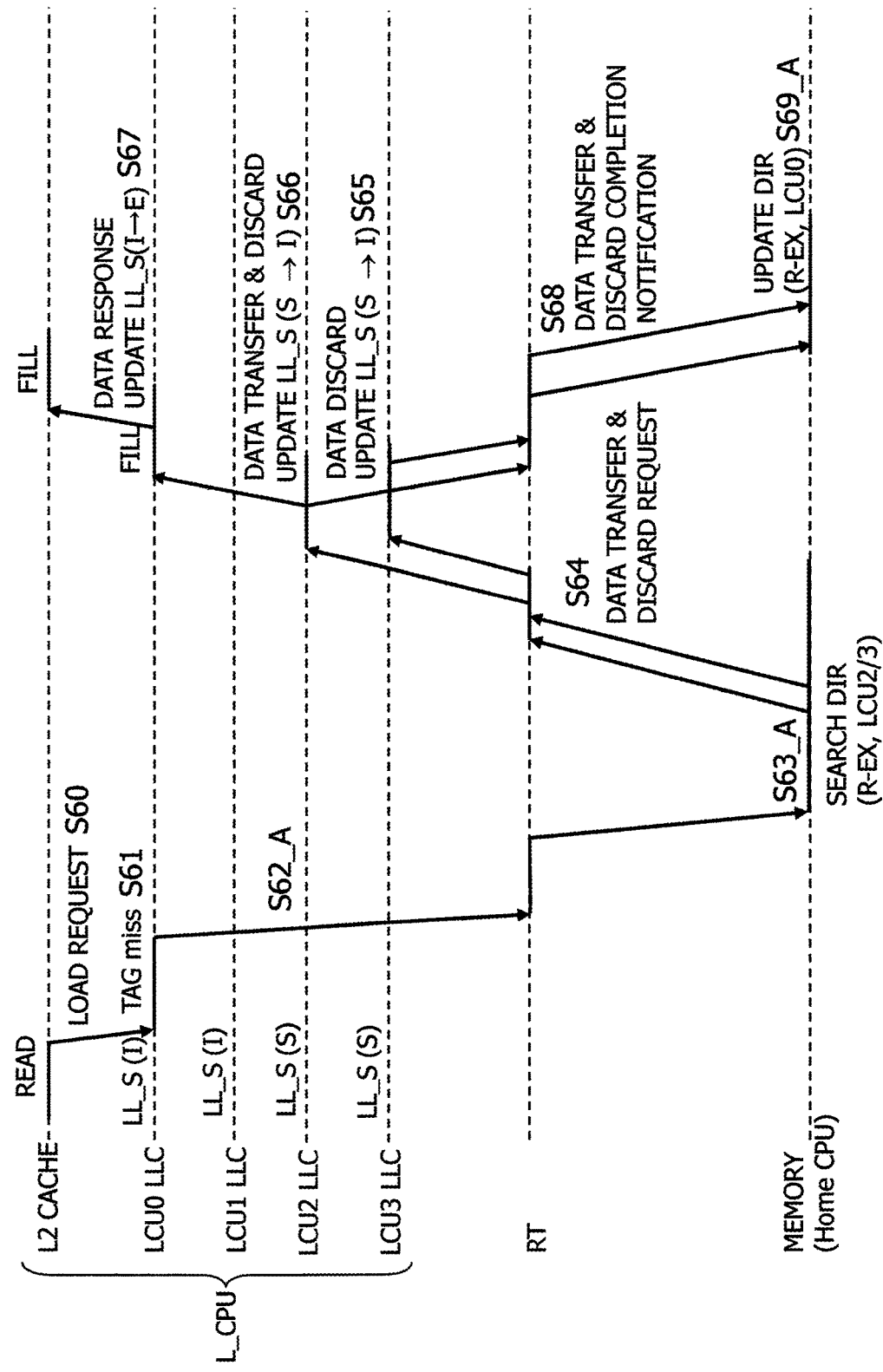
FIG. 21 is a diagram illustrating a store-premised load 4 operation based on a cache protocol using the first state LL_S (comparative example)

FIG. 21 is a diagram illustrating a store-premised load 4 operation based on a cache protocol using the first state LL_S (comparative example). As illustrated in the right-hand side of the FIG. 19, the store-premised load 4 is an operation in which, when the LLCs of the LCU2 and LCU3 of the local L-CPU are storing data in the S state, a core of LCU0 issues a store-premised load request and fills the data into the LLC of LCU0, in the E state.

In FIG. 21, a load request is issued to the LLC from the L2 cache of the LCU0 (S60). The LLC of LCU0 produces a cache miss (S61). The LLC of LCU0 issues a fetch request to the home CPU (S62_A), and the MAC of the home CPU searches the directory DIR in the memory (S63_A). As a result of this, the home CPU detects that LCU2 and LCU3 in the remote CPU (which is the same as the local L-CPU) are holding the data in the S state. Consequently, the HA of the home H-CPU issues a data transfer and discard request to the LLCs of LCU2 and LCU3 in the local L-CPU (S64), and requests transfer of the data in the LLCs of LCU2 and LCU3, to the LLC of LCU0, and discarding of the data.

Subsequently, the same processes S65, S66, S67 and S68 as FIG. 20 are executed, and the home H-CPU updates the directory so that LCU0 of the local L-CPU holds the data in the E state (S69_A).

In this way, when the second state HA_S is not used, there arises a need to access the memory managed by the home H-CPU, two times, and to refer to and change the directory. On the other hand, with the cache protocol using the first state LL_S and the second state HA_S illustrated in FIG. 20, no memory access occurs. According to the present embodiment, since the home agent HA manages the second state HA_S of a plurality of LLCs, then it is possible to complete processing within the local L-CPU, as far as possible.

[Replace]

Figure 22:
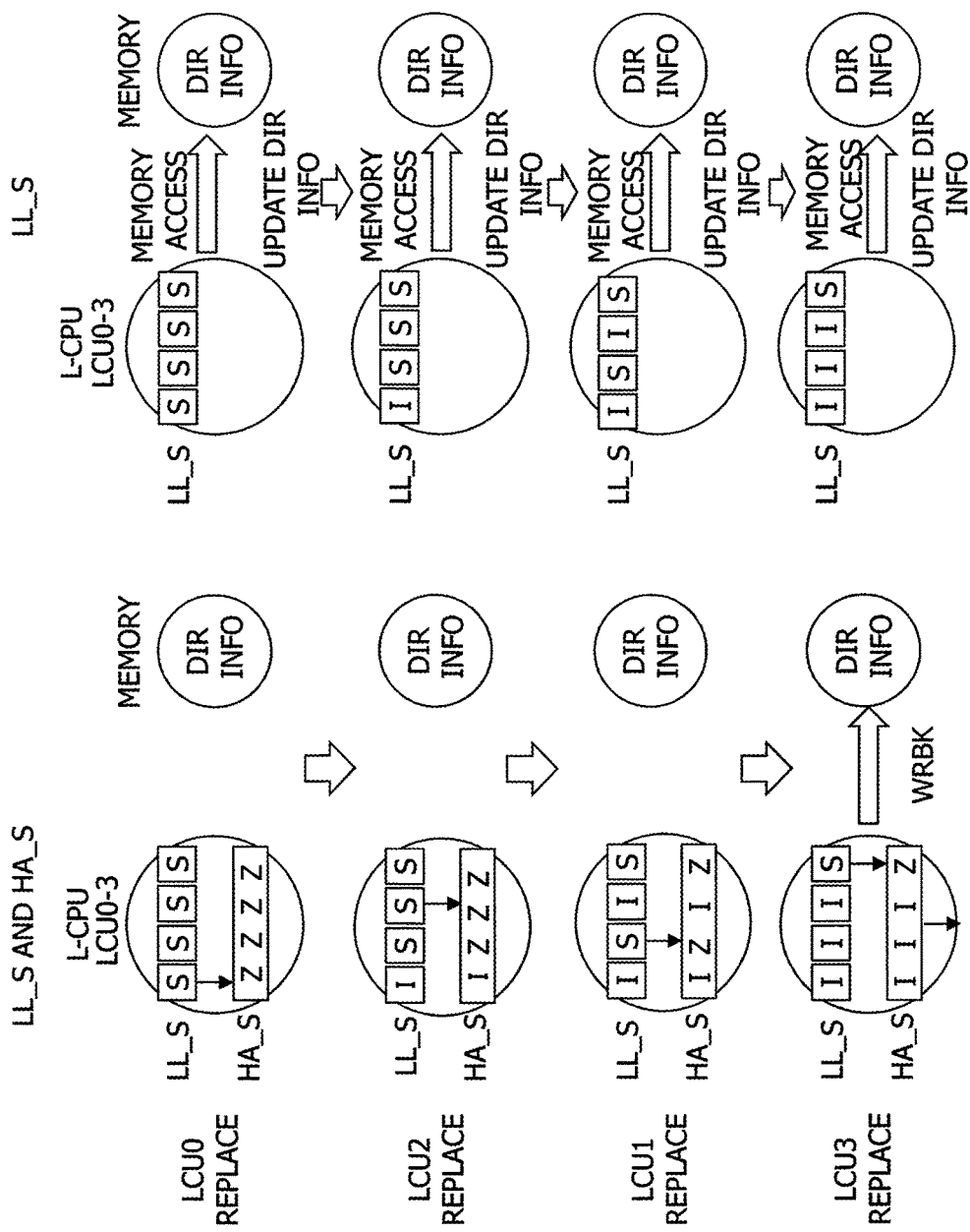
FIG. 22 is a diagram illustrating an operation in which the LLCs of the core units LCU0 to LCU3 in the local CPU (L-CPU) are replaced sequentially, in a case where the first state of the LLCs of the LCU0 to LCU3 is LL_S=S.

FIG. 22 is a diagram illustrating an operation in which the LLCs of the core units LCU0 to LCU3 in the local CPU (L-CPU) are replaced sequentially, in a case where the first state of the LLCs of the LCU0 to LCU3 is LL_S=S. In FIG. 16, the left-hand side illustrates a cache protocol operation using the first and second states LL_S and HA_S according to the present embodiment, and the right-hand side illustrates a cache protocol operation using only the first state LL_S.

Figure 23:
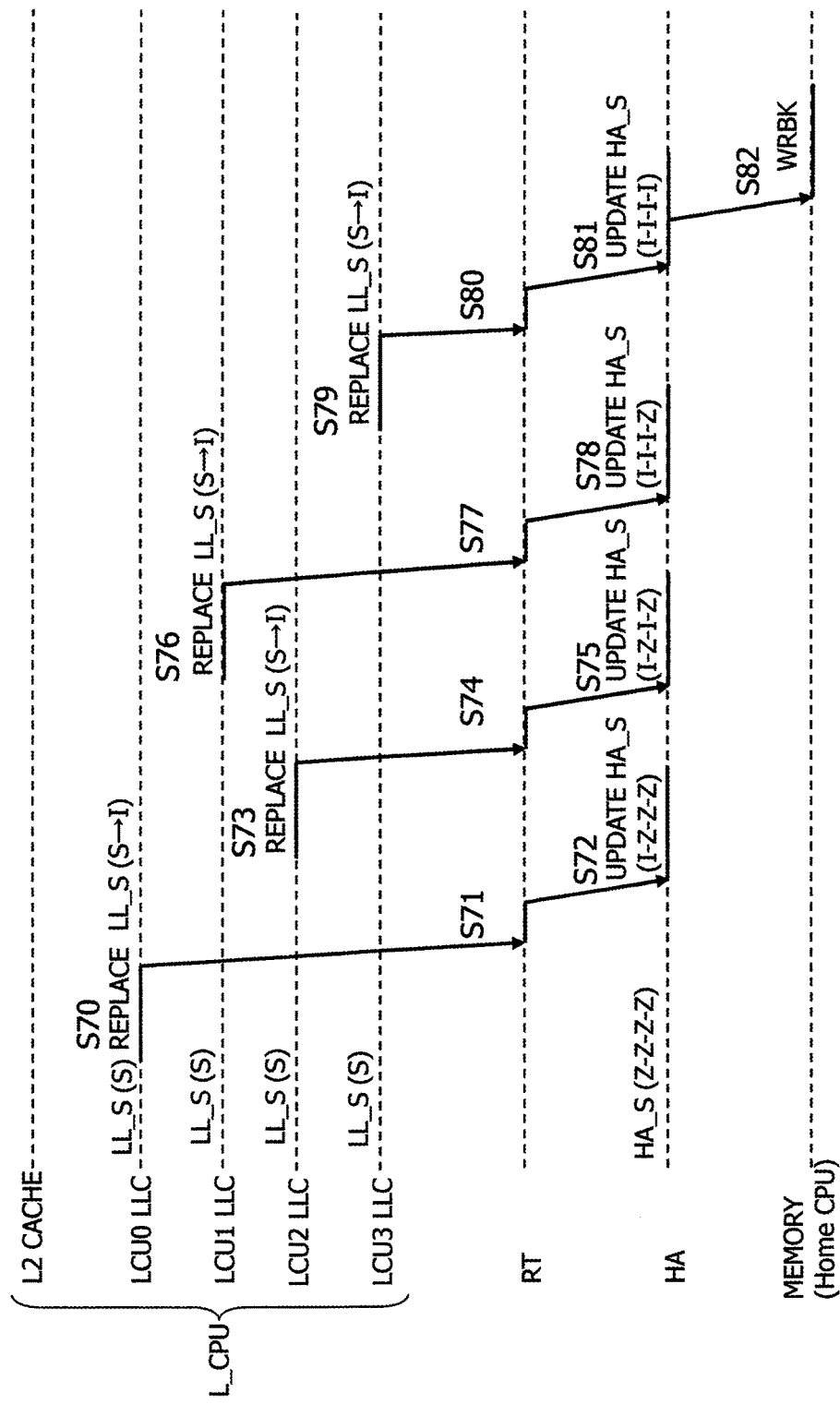
FIG. 23 is a diagram illustrating a replace operation based on a cache protocol using the first and second states according to the present embodiment.

FIG. 23 is a diagram illustrating a replace operation based on a cache protocol using the first and second states according to the present embodiment. As illustrated in the left-hand side of FIG. 22, since the second state of the four LLCs in the HA is HA_S=Z, then there is an M state between the CPUs, and an S state between the LLCs. Replacement is an operation in which, in order to expel a certain cache block in the LLC, the data therein is evicted and this evicted data is then written back to the memory. New data is then filled into the cache block from which data has been evicted. In general, when a cache miss is produced, the victim line is replaced.

In FIG. 23, the LLC of LCU0 executes a replacement, evicts the data, changes the first state LL_S from the S state to the I state (S70), and transfers the evicted data to the HA (S71), and the HA refers to the second state HA_S, detects that the LLC of another LCU is holding the same data, and changes the second state relating to LCU0, from the Z state to the I state (S72).

Next, the LLC of LCU2 executes a replacement, evicts the data, changes the first state LL_S from the S state to the I state (S73), and transfers the evicted data to the HA (S74), and the HA refers to the second state HA_S, detects that the LLC of another LCU is holding the same data, and changes the second state relating to LCU2, from the Z state to the I state (S75).

Moreover, the LLC of LCU1 executes a replacement, evicts the data, changes the first state LL_S from the S state to the I state (S76), and transfers the evicted data to the HA (S77), and the HA refers to the second state HA_S, detects that the LLC of another LCU is holding the same data, and changes the second state relating to LCU1, from the Z state to the I state (S78).

Finally, the LLC of LCU3 executes a replacement, evicts the data, changes the first state LL_S from the S state to the I state (S79), and transfers the evicted data to the HA (S80), and the HA changes the second state relating to LCU3, from the Z state to the I state (S81), determines from the second state HA_S that there is no LLC of another LCU holding the same data, and therefore writes back the data to the memory (S82). In other words, if HA_S=Z-Z-Z-Z, then only when the last dirty data has been evicted, the data is written back to the memory, and in the replacement operation up to that point, the HA only changes the second state HA_S from the Z state to the I state, but there is no occurrence of memory access.

Figure 24:
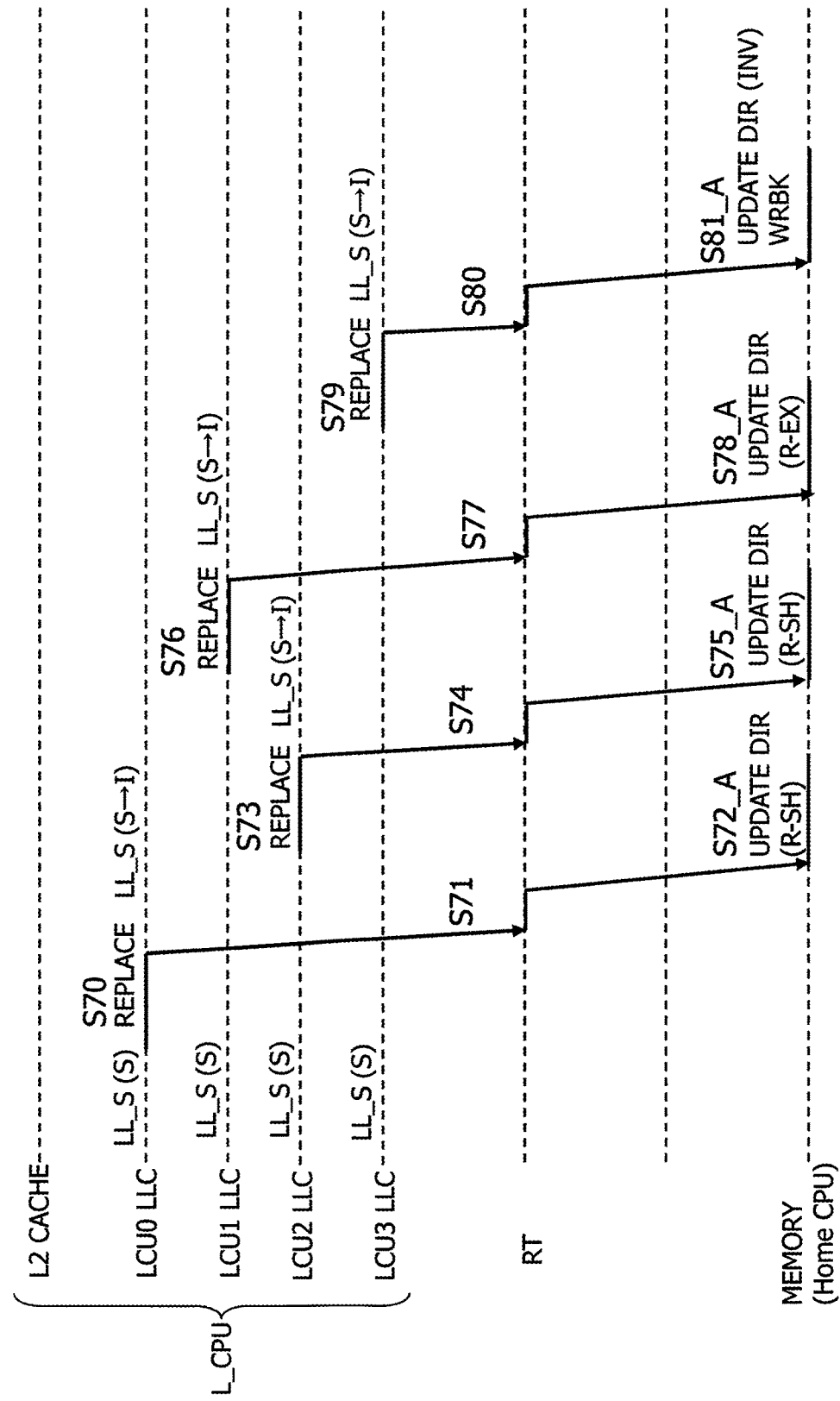
FIG. 24 is a diagram illustrating a replacement operation based on a cache protocol using the first state LL_S (comparative example)

FIG. 24 is a diagram illustrating a replacement operation based on a cache protocol using the first state LL_S (comparative example). As illustrated in the right-hand side of FIG. 22, the data is replaced successively in a state where the LLCs of the core units LCU0 to LCU3 of the local L-CPU store data in the S state.

In FIG. 24, the LCU0, LCU2, LCU1, LCU3 of the local L-CPU successively replaces data (S70, S73, S76, S79) and transfers the data (S71, S74, S77, S80). The home H-CPU accesses the memory, updates the directory successively in the R-SH state (S72_A) and (S75_A), and then changes to the R-EX state (S78_A) and finally changes to INV and writes back to the memory (S81_A). In other words, the home H-CPU accesses the memory each time to confirm and change the directory, and then finally writes back data to the memory.

In the foregoing, the five operations which are particularly beneficial in the cache protocol according to the present embodiment are described in detail. There follows a brief explanation of the five state transitions based on the cache protocol of the present embodiment.

[Store (State Transition from State 5 (E/E) to State 6 (M/E))]

Figure 25:
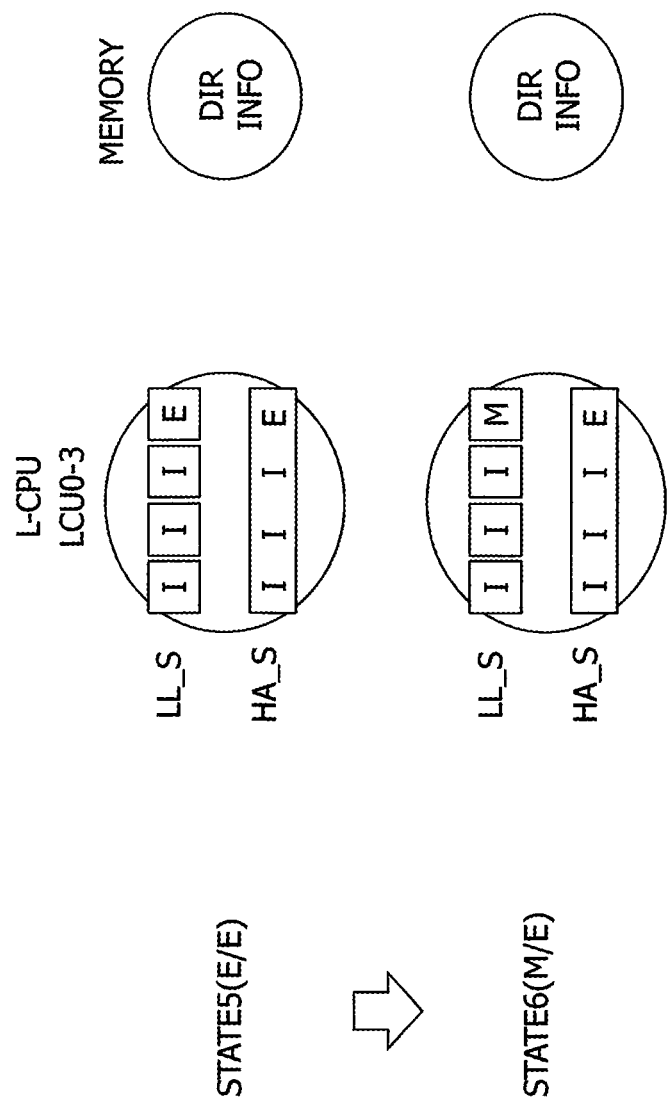
FIG. 25 is a diagram illustrating a state transition from state 5 (E/E) to state 6 (M/E)

FIG. 25 is a diagram illustrating a state transition from state 5 (E/E) to state 6 (M/E). In this example, a core in LCU3 performs a write operation for data in the E state located in the LLC of LCU3 in the local L-CPU. Since the data in the LLC of LCU3 is in the E state, then the core in the LCU3 is able to perform a write operation for this data. As a result of this, the pipeline of the LLC in LCU3 changes the first state LL_S from the E state to the M state, by a normal MESI protocol. The second state HA_S of the HA remains unchanged in the E state.

[Store (State Transition from State 7 (E/M) to State 8 (M/M))]

Figure 26:
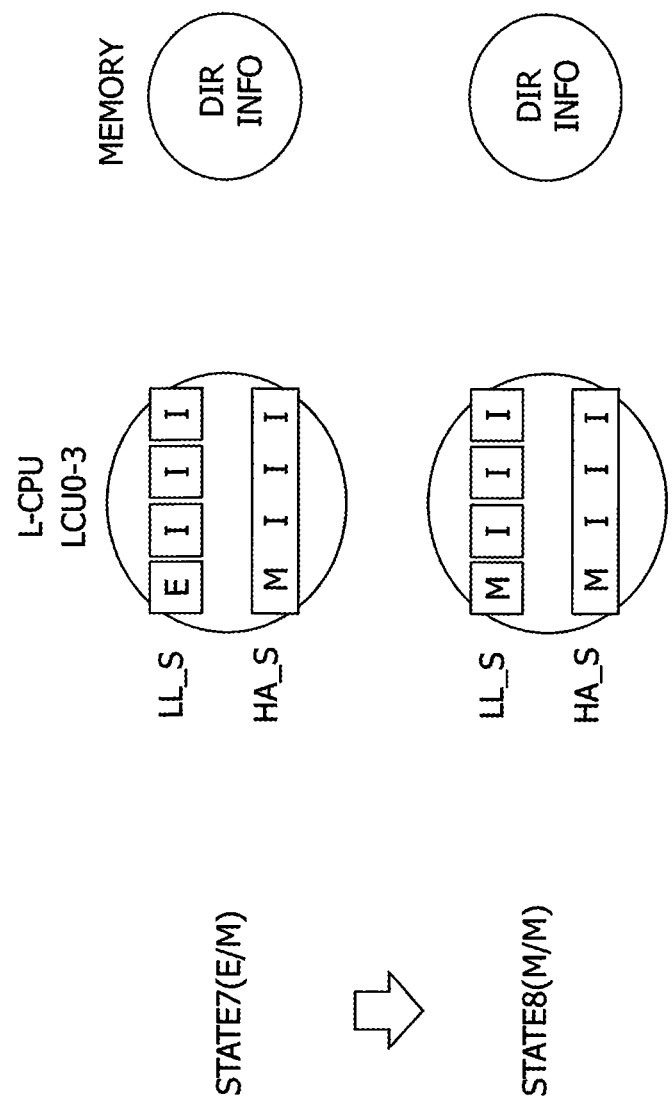
FIG. 26 is a diagram illustrating a state transition from state 7 (E/M) to state 8 (M/M)

FIG. 26 is a diagram illustrating a state transition from state 7 (E/M) to state 8 (M/M). The state transition from state 6 (M/E) to state 7 (E/M) is as described in load 2. FIG. 26 illustrates a state transition in a case where the LLC of LCU0 in the local L-CPU fills with dirty data by load 2, the first state LL_S and the second state HA_S are in state 7 (E/M), and then a core of LCU0 in the local L-CPU performs a write operation for this dirty data. Since the write operation is carried out, then the first state LL_S of the LLC in LCU0 is changed from the E state to the M state, and the second state HA_S in the HA remains unchanged in the M state. Consequently, no memory access by the home H-CPU occurs.

[Load (State Transition from State 8 (M/M) to State 7 (E/M))]

Figure 27:
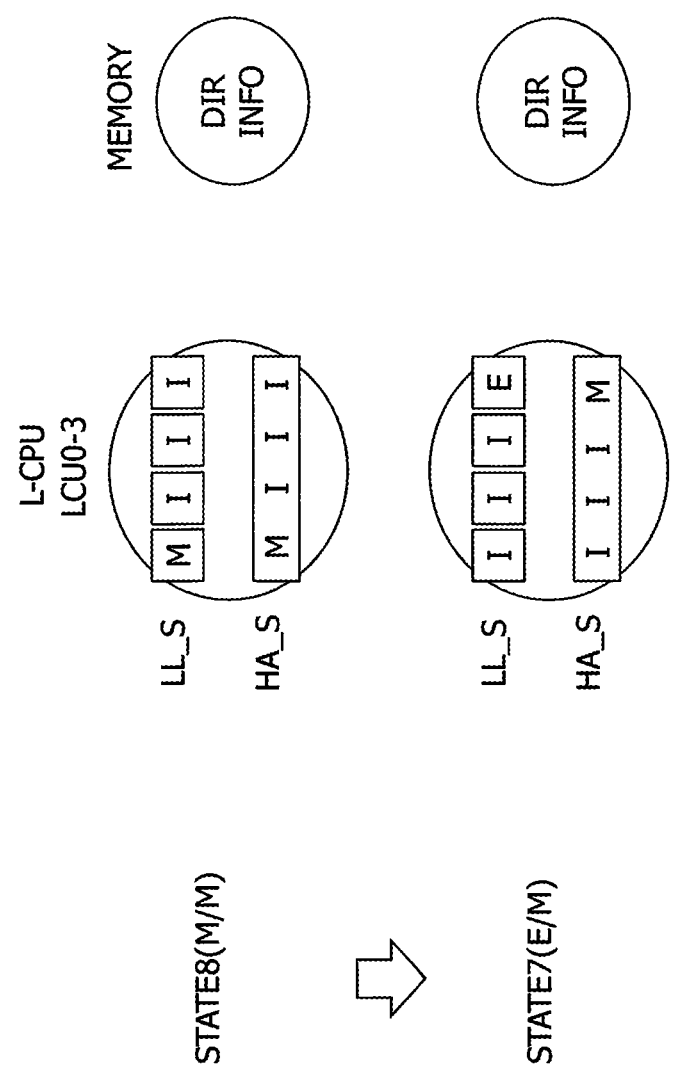
FIG. 27 is a diagram illustrating a state transition from state 8 (M/M) to state 7 (E/M)

FIG. 27 is a diagram illustrating a state transition from state 8 (M/M) to state 7 (E/M). This example illustrates a state transition when a core of LCU3 makes a load request for data in state 8 in the LLC of LCU0 in the local L-CPU. The pipeline of the LLC of LCU3 processes the load request and produces a cache miss and requests data of the HA. The HA refers to the second state HA_S, detects that the LLC of LCU0 is holding dirty data, and requests the LLC of LCU0 to transfer data to the LLC of LCU3. In response to this request, the LLC of LCU0 transfers data to the LLC of LCU3, discards the data, and changes the first state LL_S from the M state to the I state. This operation is similar to load 2 in FIG. 12.

The LLC of LCU3 sends a data transfer completion notification to the HA, and in response to this, the HA changes the second state from M-I-I-I to I-I-I-M. In this case also, no memory access by the home H-CPU occurs.

[Store-Premised Load]

Figure 28:
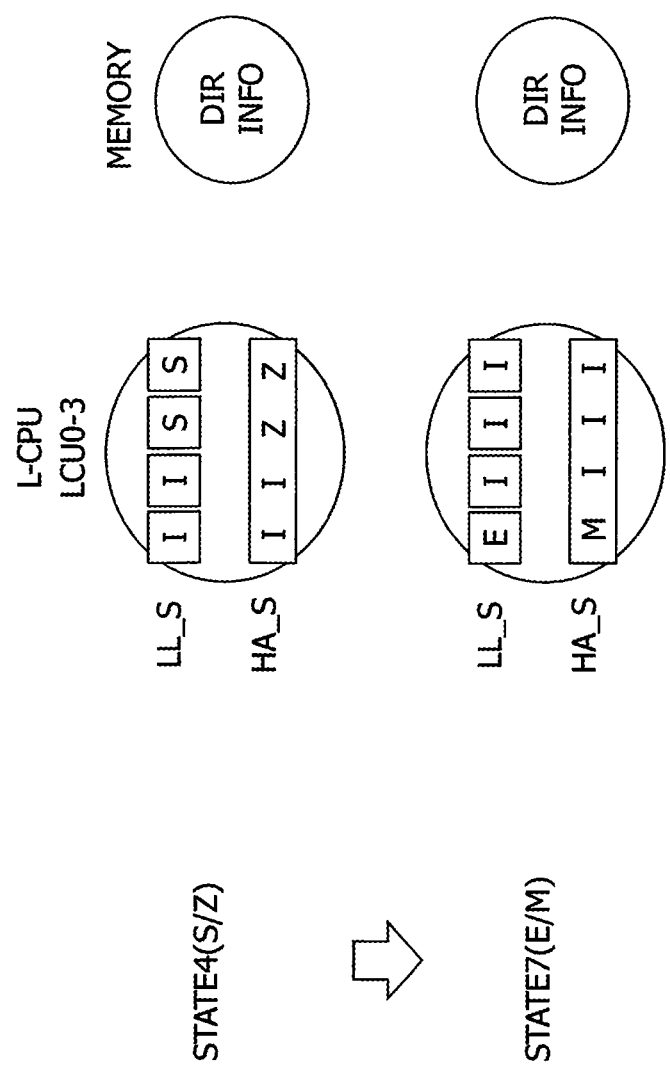
FIG. 28 is a diagram illustrating a state transition from state 4 (S/Z) to state 7 (E/M)

FIG. 28 is a diagram illustrating a state transition from state 4 (S/Z) to state 7 (E/M). This example illustrates an operation when, in a state where the LLCs of LCU2 and LCU3 of the local L-CPU are sharing dirty data, a core of LCU0 has issued a store-premised load request for that data. Similarly to the store-premised load 4 in FIG. 20, when the core in LCU0 issues a store-premised load in respect of the data in the LLC of LCU2 or LCU3 which is in a shared state, the LLC of LCU0 produces a cache miss and issues a load request to the HA. The HA refers to the second state HA_S, detects that the LCU2 and LCU3 are sharing dirty data, and requests the LLCs of LCU2 and LCU3 to transfer and discard the data. The LLC of LCU2 or LCU3 transfers the data to the LLC of LCU0, discards its own data, changes the first state LL_S from the S state to the I state, and issues a data transfer and discard completion notification to the HA. In response to this, the HA changes the second state from I-I-Z-Z, to M-I-I-I.

[Load (State Transition from State 5 (E/E) to State 2 (S/S))]

Figure 29:
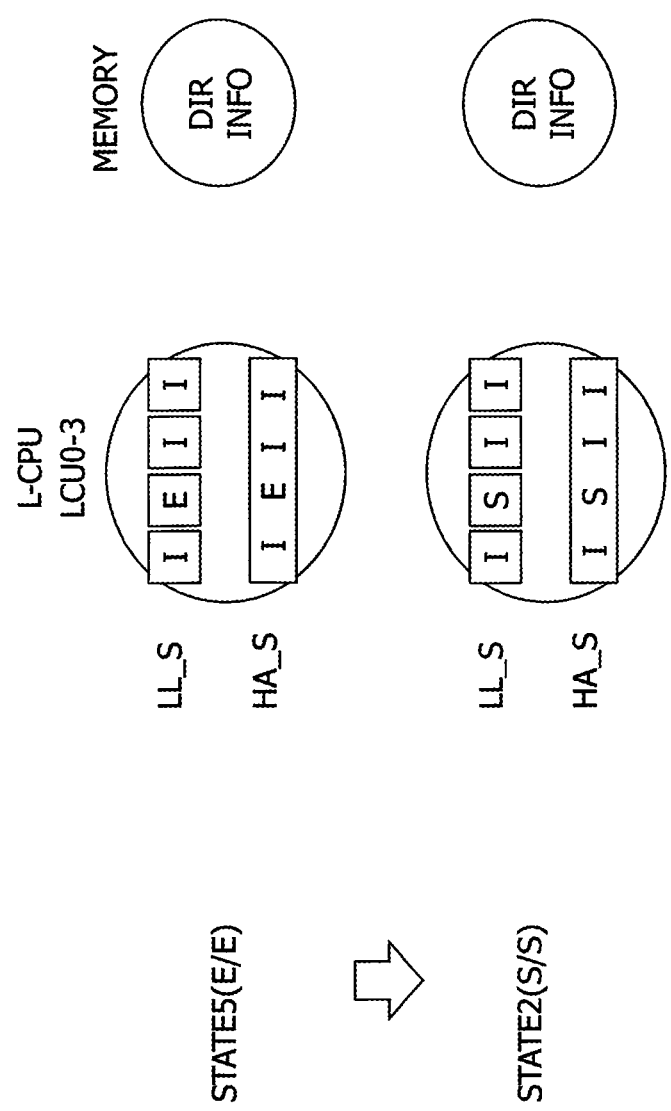
FIG. 29 is a diagram illustrating a state transition from state 5 (E/E) to state 2 (S/S).

FIG. 29 is a diagram illustrating a state transition from state 5 (E/E) to state 2 (S/S). In this example, the LLC of an LCU in another CPU has made a load request for data in the E state located in the LLC of LCU1 of the local L-CPU. In response to the data request from the LLC of the LCU in the other CPU, the HA of that CPU requests the home CPU to refer to the directory, and detects that the local L-CPU has taken out data. In response to this, when the home CPU requests the HA to transfer the data to the LLC of LCU1 in the local L-CPU, the LLC of LCU1 of the local L-CPU, in response to this, transfers the data, changes the first state from the E state to the S state, and the HA also changes the second state to the S state. In response to the transfer of data, the home H-CPU changes the directory from R-EX to R-SH.

As described above, the arithmetic processing device according to the present embodiment includes: a plurality of core units in which the plurality of cores in a chip are divided into a plurality of core units, each core unit including a plurality of the divided cores and an LLC which is shared by that plurality of cores; and an HA that is capable of connecting to the LLCs of the plurality of core units; each of the LLCs having a first tag which stores a first state indicating a MESI state for each cache block, and the HA having a second tag which stores a second state including at least a shared modify state (Z) for each of the cache blocks in the LLCs. Since the state of the cache blocks in the LLCs is managed by a combination of the first state and the second state, then the frequency of memory access in relation to load requests is suppressed and decrease in the performance of the cache memory is also suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a plurality of core units, each provided with a plurality of cores each having a arithmetic and logic unit, and a cache memory which is shared by the plurality of cores;
a home agent operatively connected to the cache memories provided respectively in the plurality of core units; and
a memory access controller operatively connected to the home agent and controls access to a main memory,
the cache memories each includes a data memory having a plurality of cache blocks, and a first tag which stores a first state indicating a MESI state, for each of the plurality of cache blocks,
the home agent includes a second tag which stores a second state including a shared modified state in which dirty data is shared by a plurality of cache memories, for each of the plurality of cache blocks in the cache memories provided respectively in each of the plurality of core units,
the home agent,
in response to a load request supplied from a first cache memory in a first core unit of any of the plurality of core units, when the second tag indicates that a second cache memory in a second core unit other than the first core unit, among the plurality of core units, is holding data corresponding to the load request in a modified state, requests the second cache memory to transfer the held data to the first cache memory, and
changes the second state of the second tags of the transfer destination cache block in the first cache memory and the transfer source cache block in the second cache memory into the shared modified state, and
the first cache memory and the second cache memory change the first state of the first tags of the transfer destination cache block and the transfer source cache block into a shared state respectively.

2. The arithmetic processing device according to claim 1, wherein
the second state further includes a shared clean state in which a plurality of cache memories share clean data; and
when the second state stored in the second tag for a cache block is the shared clean state, the first state stored in the first tag for the corresponding cache block is controlled to the shared state.

3. The arithmetic processing device according to claim 1, wherein
the home agent, in response to a load request supplied from a first cache memory in a first core unit of any of the plurality of core units, when the second tag indicates that a second cache memory in a second core unit other than the first core unit, among the plurality of core units, is holding data corresponding to the load request, requests the second cache memory to transfer the held data to the first cache memory;
the second cache memory changes the first state of the first tag; and
the home agent changes the second state of the second tag.

4. The arithmetic processing device according to claim 1, wherein the home agent does not write back data which corresponds to the load request and is held by the second cache memory, to the main memory via the memory access controller.

5. The arithmetic processing device according to claim 3, wherein,
in a case where the first state of the first tag for a certain cache block in the second cache memory is a modified state, and the second state of the second tag for the certain cache block is an exclusive state;
when data which corresponds to the load request and is held by the second cache memory has been discarded and also transferred to the first cache memory in response to the load request supplied from the first cache memory, the first cache memory changes the first state of the first tag for a transmission destination cache block to an exclusive state, and the home agent changes the second state of the second tag for the transmission destination cache block to a modified state.

6. The arithmetic processing device according to claim 5, wherein the home agent does not write back data which corresponds to the load request and is held by the second cache memory, to the main memory via the memory access controller.

7. An arithmetic processing device comprising:
a plurality of core units, each provided with a plurality of cores each having a arithmetic and logic unit, and a cache memory which is shared by the plurality of cores;
a home agent operatively connected to the cache memories provided respectively in the plurality of core units; and
a memory access controller operatively connected to the home agent and controls access to a main memory, wherein
the cache memories each includes a data memory having a plurality of cache blocks, and a first tad which stores a first state indicating a MESI state, for each of the plurality of cache blocks,
the home agent includes a second tag which stores a second state including a shared modified state in which dirty data is shared by a plurality of cache memories and a shared clean state in which a plurality of cache memories share clean data, for each of the plurality of cache blocks in the cache memories provided respectively in each of the plurality of core units,
the home agent,
in response to a load request supplied from a first cache memory in a first core unit of any of the plurality of core units, when the second tag indicates that a second cache memory in a second core unit other than the first core unit, among the plurality of core units, is holding data corresponding to the load request in an exclusive state, requests the second cache memory to transfer the held data to the first cache memory, and
changes the second state of the second tags of the transfer destination cache block in the first cache memory and the transfer source cache block in the second cache memory into the shared clean state, and the first cache memory and the second cache memory change the first state of the first tag for each of the transfer destination cache block and the transfer source cache block into a shared state respectively.

8. The arithmetic processing device according to claim 7, wherein,
in a case where the first state of the first tag for certain cache blocks in the second cache memory and a third cache memory is a shared state, and the second state of the second tag for two cache blocks corresponding to the certain cache blocks is the shared clean state,
when data which corresponds to the load request and is held by the second cache memory and the third cache memory has been discarded and also transferred to the first cache memory in response to a store-premised load request supplied from the first cache memory, the first cache memory changes the first state of the first tag for a transmission destination cache block to an exclusive state, and the home agent changes the second state of the second tag for the transmission destination cache block to an exclusive state.

9. The arithmetic processing device according to claim 3, wherein,
in a case where the first state of the first tags for certain cache blocks in the second cache memory and a third cache memory are a shared state, and the second state of the second tags for two cache blocks corresponding to the certain cache blocks are the shared modify state,
the second cache memory, in response to a replace request for replacing data in a designated cache block, discards the data in the designated cache block, and the home agent changes the second state in the second tag corresponding to the designated cache block in the second cache memory into an invalid state,
after discarding the data by the second cache memory, the third cache memory, in response to the replace request for replacing data in the designated cache block, discards the data in the designated cache block, the home agent changes the second state in the second tag corresponding to the designated cache block in the third cache memory into the invalid state and issues a write back request for writing the discarded data in the main memory to the memory access controller.

10. The arithmetic processing device according to claim 1, further comprising:
a router that provides a connection route between the cache memories in each of the plurality of core units, and between the cache memories and the home agent.

11. A method of controlling an arithmetic processing device that includes a plurality of core units, each provided with a plurality of cores each having a arithmetic and logic unit, and a cache memory which is shared by the plurality of cores, a home agent operatively connected to the cache memories provided respectively in the plurality of core units, and a memory access controller operatively connected to the home agent and controls access to a main memory, the method comprising:
changing, by the cache memories, a first state in a first tag storing the first state that indicates MESI state for each of cache blocks in the data memory, in response to a transferring and a registration of data in a data memory in the cache memories; and
changing, by the home agent, a second state in a second tag storing the second state that includes a shared modified state in which dirty data is shared by a plurality of cache memories, for each of cache blocks in the cache memory included in each of the plurality of core units, in response to the transferring and the registration of data in the data memory
by the home agent,
in response to a load request supplied from a first cache memory in a first core unit of any of the plurality of core units, when the second tag indicates that a second cache memory in a second core unit other than the first core unit, among the plurality of core units, is holding data corresponding to the load request in a modified state, requesting the second cache memory to transfer the held data to the first cache memory, and
changing the second state of the second tags of the transfer destination cache block in the first cache memory and the transfer source cache block in the second cache memory into the shared modified state, and
by the first cache memory and the second cache memory, changing the first state of the first tags of the transfer destination cache block and the transfer source cache block into a shared state respectively.

12. A method of controlling an arithmetic processing device that includes a plurality of core units, each provided with a plurality of cores each having a arithmetic and logic unit, and a cache memory which is shared by the plurality of cores, a home agent operatively connected to the cache memories provided respectively in the plurality of core units, and a memory access controller operatively connected to the home agent and controls access to a main memory, the method comprising:
changing, by the cache memories, a first state in a first tag storing the first state that indicates MESI state for each of cache blocks in the data memory, in response to a transferring and a registration of data in a data memory in the cache memories; and
changing, by the home agent, a second state in a second tag storing the second state that includes a shared modified state in which dirty data is shared by a plurality of cache memories and a shared clean state in which a plurality of cache memories share clean data, for each of cache blocks in the cache memory included in each of the plurality of core units, in response to the transferring and the registration of data in the data memory
by the home agent,
in response to a load request supplied from a first cache memory in a first core unit of any of the plurality of core units, when the second tag indicates that a second cache memory in a second core unit other than the first core unit, among the plurality of core units, is holding data corresponding to the load request in an exclusive state, requesting the second cache memory to transfer the held data to the first cache memory, and
changing the second state of the second tags of the transfer destination cache block in the first cache memory and the transfer source cache block in the second cache memory into the shared clean state, and
by the first cache memory and the second cache memory, changing the first state of the first tags of the transfer destination cache block and the transfer source cache block into a shared state respectively.

* * * * *